US009063621B2

(12) United States Patent
Kim et al.

(10) Patent No.: US 9,063,621 B2
(45) Date of Patent: Jun. 23, 2015

(54) TOUCH SENSOR PANEL

(75) Inventors: Jae Hong Kim, Seoul (KR); Do Hwan Oh, Seoul (KR)

(73) Assignee: MELFAS, INC., Seoul (KR)

(*) Notice: Subject to any disclaimer, the term of this patent is extended or adjusted under 35 U.S.C. 154(b) by 144 days.

(21) Appl. No.: 13/540,861

(22) Filed: Jul. 3, 2012

(65) Prior Publication Data
US 2012/0319974 A1 Dec. 20, 2012

Related U.S. Application Data

(63) Continuation of application No. PCT/KR2012/000292, filed on Jan. 12, 2012.

(30) Foreign Application Priority Data

Jun. 20, 2011 (KR) .................. 10-2011-0059814
Jul. 6, 2011 (KR) .................. 10-2011-0066953

(51) Int. Cl.
G06F 3/044 (2006.01)

(52) U.S. Cl.
CPC ...... G06F 3/044 (2013.01); *G06F 2203/04101* (2013.01); *G06F 2203/04104* (2013.01)

(58) Field of Classification Search
CPC ..................................................... G06F 3/044
USPC ............. 345/156–184, 104; 178/18.01–20.04
See application file for complete search history.

(56) References Cited

U.S. PATENT DOCUMENTS

| 7,258,586 | B2* | 8/2007 | Tamura et al. ................. 445/24 |
| 8,125,463 | B2* | 2/2012 | Hotelling et al. ............. 345/173 |
| 8,319,747 | B2* | 11/2012 | Hotelling et al. ............. 345/174 |
| 2003/0052867 | A1* | 3/2003 | Shigetaka et al. ............. 345/173 |
| 2003/0117572 | A1* | 6/2003 | Kanayama et al. ........... 349/155 |
| 2006/0097991 | A1* | 5/2006 | Hotelling et al. ............. 345/173 |
| 2007/0008299 | A1* | 1/2007 | Hristov ........................ 345/173 |
| 2008/0278178 | A1* | 11/2008 | Philipp ......................... 324/662 |
| 2009/0085885 | A1* | 4/2009 | Wu et al. ...................... 345/173 |
| 2009/0091551 | A1 | 4/2009 | Hotelling et al. |
| 2009/0267916 | A1* | 10/2009 | Hotelling ...................... 345/174 |
| 2009/0309851 | A1* | 12/2009 | Bernstein ...................... 345/174 |
| 2009/0314621 | A1* | 12/2009 | Hotelling ...................... 200/600 |
| 2010/0013800 | A1* | 1/2010 | Elias et al. .................... 345/178 |
| 2010/0045625 | A1* | 2/2010 | Yang et al. .................... 345/173 |
| 2010/0059294 | A1* | 3/2010 | Elias et al. ................. 178/18.06 |
| 2010/0090979 | A1* | 4/2010 | Bae ............................... 345/174 |
| 2010/0144391 | A1 | 6/2010 | Chang et al. |
| 2010/0149108 | A1* | 6/2010 | Hotelling et al. ............. 345/173 |

(Continued)

FOREIGN PATENT DOCUMENTS

| JP | 2011-018177 | 1/2011 |
| JP | 2011-039662 | 2/2011 |

(Continued)

*Primary Examiner* — Patrick F Marinelli
(74) *Attorney, Agent, or Firm* — McKenna Long & Aldridge LLP

(57) ABSTRACT

A touch sensor panel used for a display device is provided. The touch sensor panel can precisely determine a touch location with a given area of electrodes, can reduce the number of channels required, and can reduce the influence of noise. In addition, the touch sensor panel can improve sensing resolution with a given number of electrode channels, can be robust against noise, and can improve linearity by precisely determining a touch location and visibility of displayed image by dummy electrodes.

22 Claims, 19 Drawing Sheets

(56) References Cited

U.S. PATENT DOCUMENTS

| | | |
|---|---|---|
| 2010/0156805 A1 | 6/2010 | Brand et al. |
| 2010/0182253 A1* | 7/2010 | Park et al. .................... 345/173 |
| 2011/0273391 A1* | 11/2011 | Bae .............................. 345/173 |
| 2012/0050333 A1* | 3/2012 | Bernstein ..................... 345/660 |
| 2012/0194471 A1* | 8/2012 | Park et al. .................... 345/174 |

FOREIGN PATENT DOCUMENTS

| | | |
|---|---|---|
| KR | 10-2008-0081411 | 9/2008 |
| KR | 10-2010-0126140 | 12/2010 |
| WO | WO 2008/108514 | 9/2008 |

* cited by examiner (a)

(b)

Fig. 4
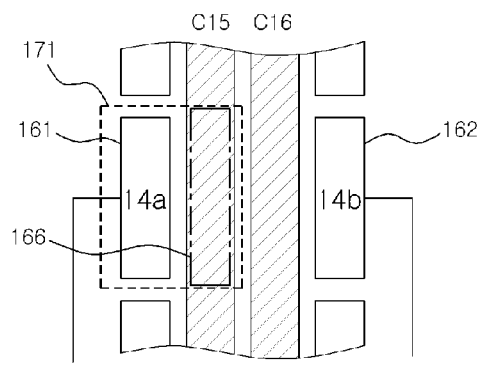
(a)
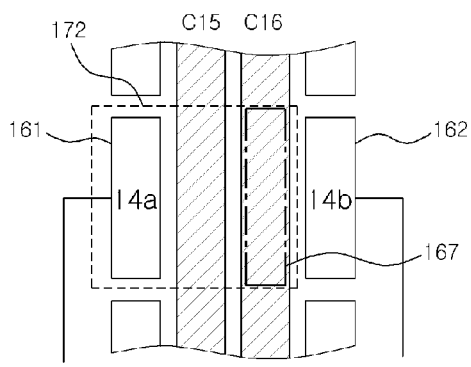
(b)
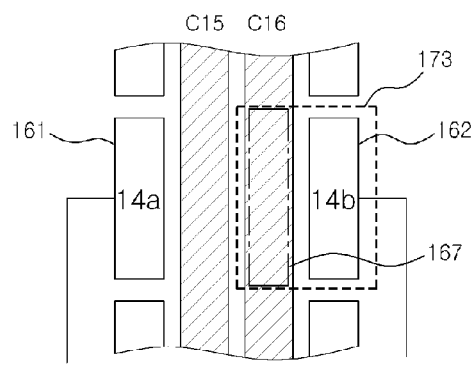
(c)
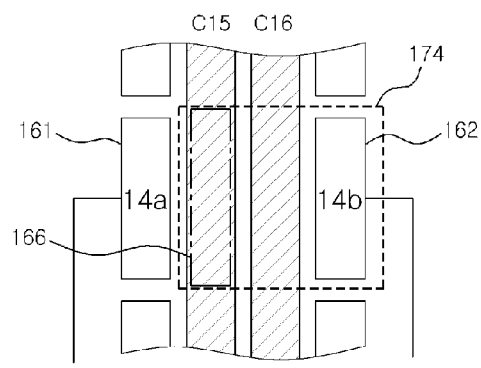
(d)

Fig. 14
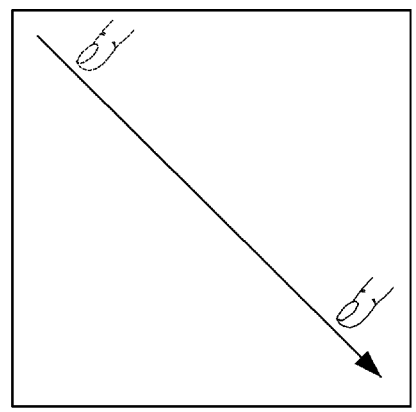
(a)
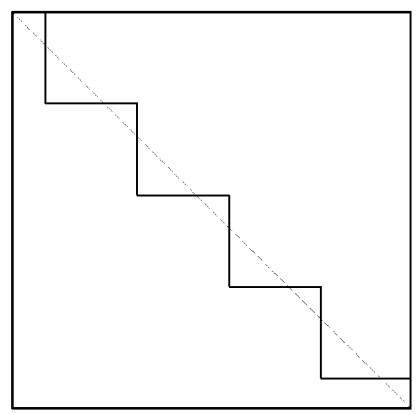
(b)
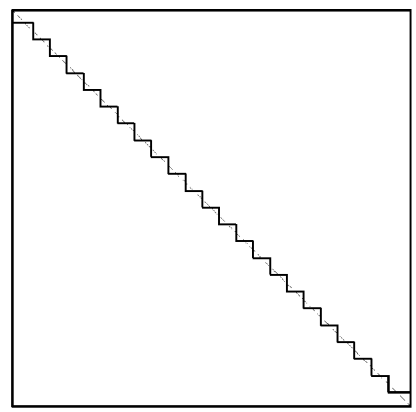
(c)

Fig. 15
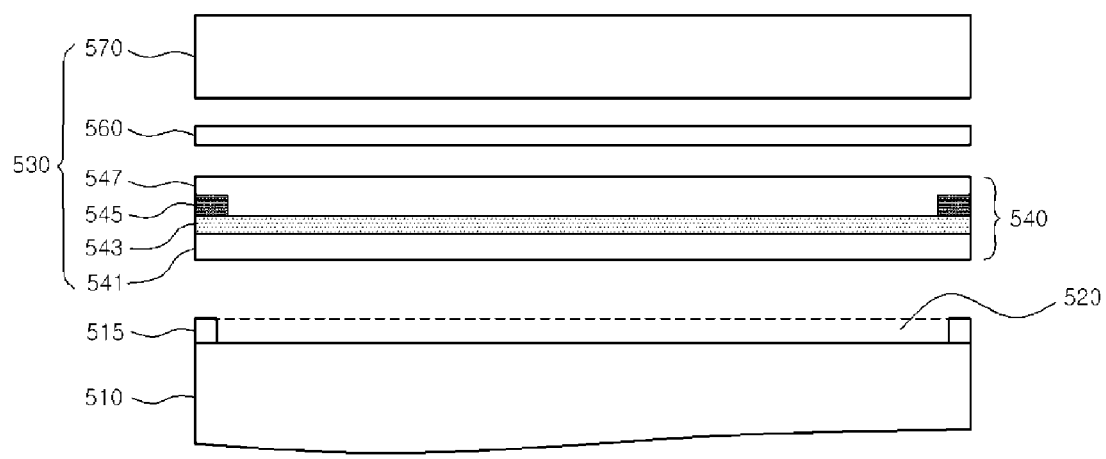
(a)
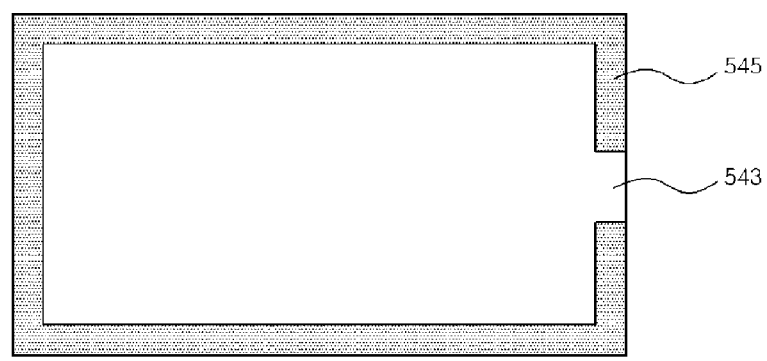
(b)

TOUCH SENSOR PANEL

CROSS-REFERENCE TO RELATED APPLICATIONS

This application is a continuation of International Application No. PCT/KR2012/000292, filed Jan. 12, 2012, which claims priority to Korean Application Nos. 10-2011-0059814, filed on Jun. 20, 2011, and 10-2011-0066953 filed on Jul. 6, 2011, all of which hereby are incorporated by reference in their entirety for all purposes as if fully set forth herein.

BACKGROUND OF THE INVENTION

1. Field of the Invention

The present invention relates to a touch sensor panel with improved touch sensitivity and a method of manufacturing the same, and more particularly, a touch sensor panel capable of precisely determining a touch location with a given area of electrodes, reducing the number of channels required, reducing the influence of noise and improving visibility of displayed image.

2. Discussion of the Related Art

With the widespread distribution of mobile phones equipped with touch screens and the commercialization of various types of smart phones, touch sensing technology has been vigorously researched.

Touch screens, which are one of the most common touch sensing devices, are classified as resistive, capacitive, ultrasonic, or infrared (IR) touch screens according to their operating methods. Capacitive touch screens, in particular, have been widely adopted in various fields due to their high durability, long lifetime, and capability of supporting multi-touch function.

A capacitive touch screen may detect a touch location based on a capacitance variation resulting from a user's touch on the front surface of a display window thereof. Thus, the capacitive touch screen may not be able to properly detect a touch input when the touch input is made by, for example, a stylus pen, which accompanies a slight capacitance variation.

Given that the structure of a touch sensor panel is an important factor for properly detecting a variation in capacitance, it is beneficial to develop a touch sensor panel capable of detecting a touch input (e.g., a touch input made by a stylus pen or fingernail) that accompanies a slight capacitance variation.

It is also beneficial to develop a touch sensor panel capable of precisely determining the location of a touch input without distorting touch sensing signals.

In the meantime, a related-art electrode architecture for detecting a multi-touch input has a double-layer structure consisting of two layers, and each of the two layers includes a plurality of electrode lines arranged along an X direction and a plurality of electrode lines arranged along a Y direction. Since the related-art electrode architecture is required to have an electrode pattern formed for each of the two layers, the fabrication of the related-art electrode architecture is complicated, and the manufacturing cost of related-art electrode architecture is generally high. To address the problems associated with the related-art electrode architecture, the applicant of the subject application has developed a single-layer electrode pattern capable of detecting a multi-touch input. In the single-layer electrode pattern, however, the distance between adjacent electrodes or adjacent internal wirings is so small that electrodes connected to different channels may be short-circuited upon occurrence of, for example, etching error, or infiltration of foreign materials during a manufacturing process, and that product defects may occur. For example, to reduce such product defects, the distance between electrodes may be widened. However, in this example, an electrode pattern may undesirably become visible to the naked eye due to the difference between the transmittance of etched parts and non-etched parts, and thus, the visibility of displayed image may deteriorate. Therefore, a method is needed to provide a touch sensor panel capable of preventing electrodes connected to different channels from being short-circuited due to etching error or the infiltration of foreign materials, reducing a defect rate, and improving visibility regardless of the difference between the transmittance of electrodes and non-electrodes.

SUMMARY OF THE INVENTION

Accordingly, the present invention is directed to a touch sensor panel and a method of manufacturing the same that substantially obviates one or more of the problems due to limitations and disadvantages of the related art.

An advantage of the present invention is to provide a touch sensor panel capable of recognizing a touch input that is generated by a user's touch thereon and accompanies a minor capacitance variation.

Another advantage of the present invention is to provide a touch sensor panel capable of increasing an actual sensing region with a given number of electrode channels.

Another advantage of the present invention is to provide a touch sensor panel capable of improving linearity without distorting signals.

Another advantage of the present invention is to provide a touch sensor panel capable of allowing a user to generate multiple touches precisely and providing robustness against noise.

Another advantage of the present invention is to provide a touch sensor panel capable of preventing electrodes connected to different channels from being short-circuited due to etching error or the infiltration of foreign materials, reducing a defect rate, and improving visibility regardless of the difference between the transmittance of electrodes and non-electrodes.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a touch sensor panel may include a touch detection area on a surface of a substrate, the touch detection area including a plurality of sensing regions; and a wiring area on the surface of the substrate outside the touch detection area. The touch detection area includes a plurality of vertical electrodes that extend into the wiring area and are arranged along a plurality of vertical axes, each vertical electrode including a plurality of sensing sectors, a plurality of horizontal electrodes that each form a part of a sensing region, are arranged to be adjacent to the vertical electrodes and include a plurality of patches formed of a conductive material, each patch forming a part of one of the horizontal electrodes, and a plurality of dummy electrodes that are insulated from each other and from at least some of the vertical electrodes and the patches. The horizontal electrodes include first and second horizontal electrodes that are arranged along a first horizontal axis; the vertical electrodes include a first vertical electrode having a plurality of sensing sectors including a first sensing sector that is disposed between a first patch of the first horizontal electrode and a second patch of the second horizontal electrode, forms a first sensing area with the first patch, and forms a second sensing area with the second patch. The first and second patches are adjacent to each other and partially face each other. The first and second sensing areas at least partially overlap each other.

According to the present invention, a touch sensor panel can provide high sensing resolution even for a limited number of electrode channels, and is robust against noise. Also, the touch sensor panel can precisely determine a touch location and improve linearity. Also, the touch sensor panel can improve visibility of displayed image and can reduce a defect rate that may be raised by short-circuited electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4(a) to 4(d) are enlarged views illustrating examples of a portion of a touch detection region illustrated in FIG. 1 where a plurality of sensing regions are formed;

FIGS. 14(a) to 14(c) are diagrams for explaining the concept of linearity;

FIGS. 15(a) and 15(b) are diagrams illustrating a touch sensor panel including a shield layer according to another exemplary embodiment;

DETAILED DESCRIPTION OF THE ILLUSTRATED EMBODIMENTS

Figure 1:
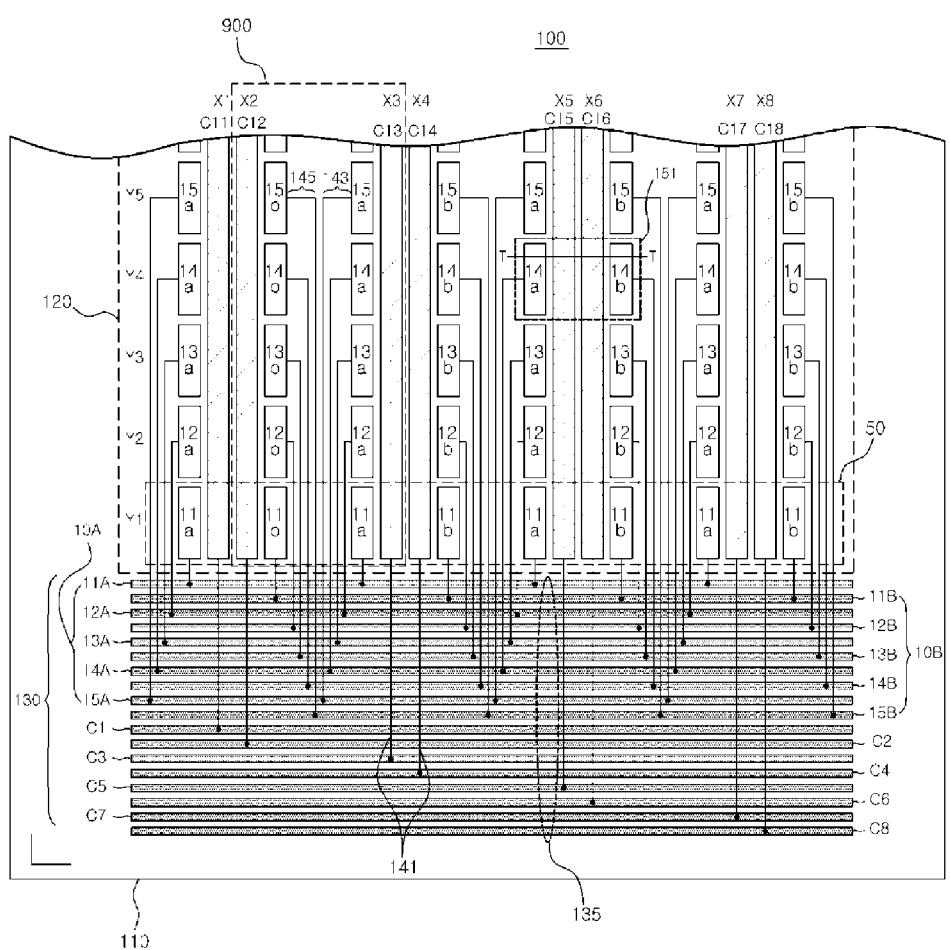
FIG. 1 is a partial view of a touch sensor panel according to an exemplary embodiment.

Exemplary embodiments are directed to a touch sensor panel for use in a touch sensor device such as, for example, a touchpad or a touch screen. For example, the touch sensor device may be a device capable of detecting a user's touch on a panel that is installed over a display screen or provided separately from the display screen. Information indicating whether there is a touch input detected from the panel or information indicating the location of the touch input may be used to control the operation of a computer system equipped with the touch sensor device or to manipulate data displayed on the screen of the computer system. The touch sensor panel may be installed or attached to a digital device such as, for example, a desktop personal computer (PC), a notebook computer, a tablet PC, a kiosk equipped with a large-scale display, a mobile communication terminal, a smart phone, a smart pad, a digital broadcast receiver, a personal digital assistant (PDA), a portable multimedia player (PMP), a navigation device, an electronic-book (e-book) reader, or the like.

The term 'touch sensor panel,' as used herein, may indicate not only a mutual capacitance multi-touch sensor panel but also a self-capacitance touch sensor panel or a single-touch sensor panel. Touch panels according to exemplary embodiments may have an array of horizontal electrodes and vertical electrodes that intersect each other and can detect a touch location in horizontal and vertical directions. In another example, touch panels may be configured to have an electrode array in which electrodes may be arranged diagonally, in a fan shape, in a concentric manner, three-dimensionally, and various other directions.

The term 'adjacent,' as used herein, may indicate that there are no other elements between two adjacent elements. The term 'neighboring,' as used herein, may indicate that, between two neighboring elements, there may be no in-between elements of the same type as the two neighboring elements, but there may be one or more other in-between elements of a different type from the two neighboring elements. For example, between two neighboring vertical electrodes, there may be no in-between vertical electrodes, but there may be one or more in-between horizontal electrodes. For example, between a pair of neighboring horizontal and vertical electrodes, there may be no in-between vertical or horizontal electrodes, but there may be one or more other in-between elements such as, internal electrodes.

The term 'partially facing,' as used herein, may indicate two adjacent or neighboring elements face each other, but are not precisely aligned with each other with respect to a given virtual axis. For example, in a case in which two arbitrary electrode patches A and B face each other, the orthogonal projections of the electrode patches A and B at least partially overlap with respect to an axis that is perpendicular to an axis penetrating the electrode patches A and B. Alternatively, in a case in which the electrode patches A and B partially face each other, the orthogonal projections of the electrode patches A and B overlap, but only partially, with respect to the axis that is perpendicular to the axis penetrating the electrode patches A and B.

Figure 2:
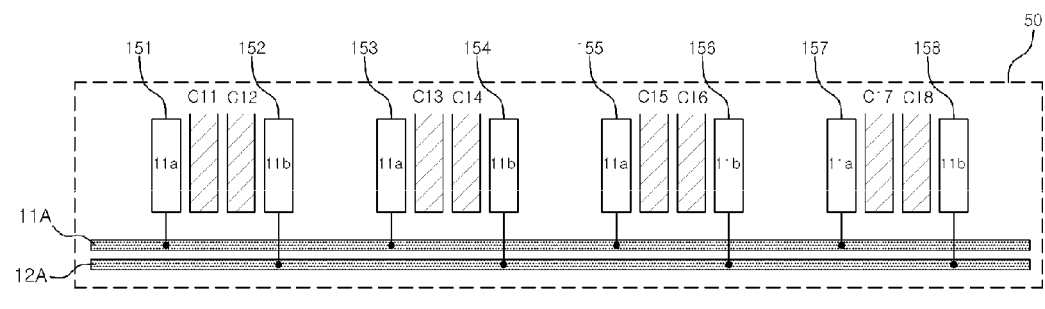
FIGS. 2(a) and 2(b) are plan views illustrating exemplary arrangements of partitioning electrodes.
Figure 3:
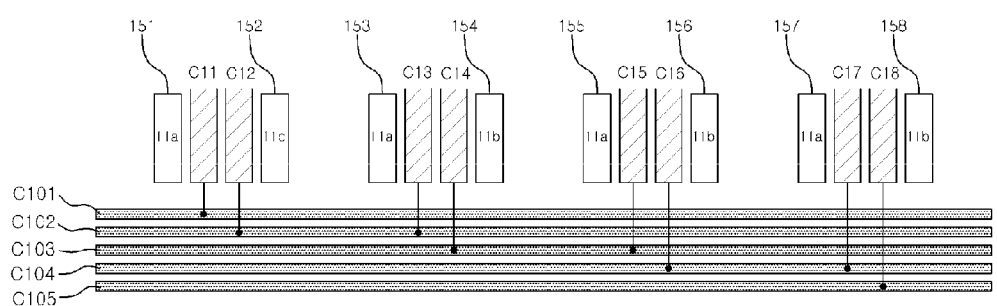
FIG. 3 is a plan view illustrating an exemplary arrangement of vertical electrodes.

Reference will now be made in detail to exemplary embodiments of the present invention, examples of which are illustrated in the accompanying drawings FIG. 1 is a plan view illustrating part of a touch sensor panel according to an exemplary embodiment. FIGS. 2(a) and 2(b) are plan views illustrating exemplary arrangements of partitioning electrodes. FIG. 3 is a plan view illustrating an exemplary arrangement of vertical electrodes. FIGS. 4(a) to 4(d) are enlarged views illustrating examples of a plurality of sensing regions formed in the touch sensor panel illustrated in FIG. 1. FIGS. 5(a) to 5(d) are plot diagrams of mutual capacitance that is measured from a portion of the touch sensor panel illustrated in FIG. 1. FIG. 6 is an enlarged view of a portion of the touch sensor panel illustrated in FIG. 1.

In the drawings, the size and relative sizes of layers and regions may be exaggerated for clarity.

Referring to FIG. 1, a touch sensor panel 100 includes a touch detection area 120 in which a plurality of overlap sensing regions are arranged, a wiring area 130 that is provided outside the touch detection area 120, and a plurality of sensing electrodes 122 (i.e., a plurality of vertical electrodes C11 to C18 and a plurality of horizontal electrodes 11a to 15a and 11b to 15b) that are arranged in the touch detection area 120.

The term 'sensing region,' as used herein, may not necessarily indicate an area physically or electrically separate from another region. Instead, the term 'sensing region' may indicate an area in which static capacitance varies in response to a touch input from a user.

The touch detection area 120 may be an area in which a plurality of sensing electrodes 122 are arranged for sensing any touch location on a substrate 100. The wiring area 130 may account for the whole substrate 100 except for the touch detection area 120. A plurality of wires (i.e., a plurality of bus lines) 135 may be disposed in the wiring area 130. The wires 135 may connect the sensing electrodes 122 in the touch detection area 120 to a touch sensor circuit unit (not shown). The touch sensor circuit unit may sense and determine a touch location based on a variation in capacitance in the touch detection area 120 that results from the user's touch. For an electrical connection, each of the sensing electrodes 122 may have an extension line that may extend into the wiring area 130.

Referring to FIG. 1, wires C1 to C8 are connected to the vertical electrodes C11 to C18, and wires 11A to 15A and 11B to 15B are connected to the horizontal electrodes 11a to 15a and 11b to 15b, respectively. The wires 135 may serve as channels. The wires 135 may be formed on the substrate 100 at the same level as the sensing electrodes 122. For example, the wires 135 may be disposed on a different level from the horizontal electrodes 11a to 15a and 11b to 15b or the vertical electrodes C11 to C18 and may be connected to the horizontal electrodes 11a to 15a and 11b to 15b and the vertical electrodes C11 to C18 through a plurality of vias. In another example, the wires 135 may be disposed on the substrate 100 at the same level as the horizontal electrodes 11a to 15a and 11b to 15b or the vertical electrodes C11 to C18. In this example, the wires 135 may be insulated from the horizontal electrodes 11a to 15a and 11b to 15b or the vertical electrodes C11 to C18 by depositing a dielectric material at each of the intersections between the wires 135 and the horizontal electrodes 11a to 15a and 11b to 15b or between the wires 135 and the vertical electrodes C11 to C18

The vertical electrodes C11 to C18 may be disposed at horizontal locations X1 to X8, respectively, in the touch detection area 120, thereby forming a plurality of sensing regions. The vertical electrodes C11 to C18 may also form the sensing regions with other electrodes. The touch sensor circuit unit may determine the X-axis component of a touch location using the vertical electrodes C11 to C18. Each of the vertical electrodes C11 to C18 may include an extension line 141 that extends into the wiring area 130. In the example illustrated in FIG. 1, the extension lines 141 of the vertical electrodes C11 to C18 all extend into a wiring area that is provided below a panel (not shown). In another example, some of the extension lines 141 of the vertical electrodes C11 to C18 may extend into a wiring area that is provided above the panel. The vertical electrodes C11 to C18 may be connected to different wires. For example, the vertical electrodes C11 to C18 may be connected to the wires C1 to C8, respectively. Some of the vertical electrodes C11 to C18 may be electrically connected to each other, as illustrated in FIG. 3.

Still referring to FIG. 1, the vertical electrodes C11 to C18 may be formed as bars that extend in a vertical direction. In another example, the vertical electrodes C21 to C28 may be formed in various shapes, other than a bar shape, as long as they can form a regular pattern.

The horizontal electrodes 11a and 11b, 12a and 12b, 13a and 13b, 14a and 14b, and 15a and 15b may be disposed at vertical locations Y1, Y2, Y3, Y4, and Y5, respectively, thereby forming a plurality of sensing regions. The horizontal electrodes 11a to 15a and 11b to 15b may form the sensing regions with other electrodes. The touch sensor circuit unit may determine the Y-axis component of a touch location by using the horizontal electrodes 11a to 15a and 11b to 15b. The horizontal electrodes 11a to 15a and 11b to 15b may be formed on the substrate 100 at the same level as the vertical electrodes C11 to C18 in the vicinity of the vertical electrodes C11 to C18. Each of the horizontal electrodes 11a to 15a and 11b to 15b may include a plurality of partitioning electrodes and an extension line 143 or 145 by which the partitioning electrodes are electrically connected to one another in the wiring area 130. The term "partitioning electrodes at particular locations", as used herein, may indicate partitioning electrodes substantially aligned with a particular horizontal axis. That is, a horizontal axis that penetrates through the center of a partitioning electrode of a horizontal electrode may also penetrate through the center of the rest of the partitioning electrodes of the horizontal electrode. The extension lines 143 and 145 may also be referred to as internal wires, independently of the horizontal electrodes 11a to 15a and 11b to 15b. The internal wires 143 and 145 may be classified into a first internal wire mostly disposed on the touch detection area 120 and a second internal wire mostly disposed on the wiring area 130. Partitioning electrodes may be formed at the same time with the internal wires 143 and 145 or may be formed at the same time with the first internal wire.

The vertical electrodes C11 to C18 and the horizontal electrodes 11a to 15a and 11b to 15b may be formed of a transparent conductive material, such as indium tin oxide (ITO), ZnO, indium zinc oxide (IZO), a carbon nanotube (CNT), or the like. The vertical electrodes C11 to C18 and the horizontal electrodes 11a to 15a and 11b to 15b may be formed of the same material. Some of the extension lines of the electrodes 11a to 15a and 11b to 15b may be formed of a metallic material to increase the conductivity of the horizontal electrodes 11a to 15a and 11b to 15b or the thermal resistance of the vertical electrodes C11 to C18 and the horizontal electrodes 11a to 15a and 11b to 15b in case the vertical electrodes C11 to C18 and the horizontal electrodes 11a to 15a and 11b to 15b are connected to external wirings through a plurality of vias. For example, a part of the extension lines of the electrodes 11a to 15a and 11b to 15b in the touch detection area 120, i.e., the first internal wire, may be formed of a transparent conductive material, and another part of the extension lines of the electrodes 11a to 15a and 11b to 15b outside the touch detection area 120, i.e., the second internal wire, may be formed of silver, copper, or the like.

The substrate 110 may be a transparent window. The transparent window may be formed of a highly rigid material such as tempered glass or an acrylic resin or a soft material that may be used to manufacture a flexible display, such as a polyethylene terephthalate (PET), polycarbonate (PC), polyester sulfone (PES), polyimide (PI), polymethyl methacrylate (PMMA), or the like. The transparent window may maintain the external shape of the touch sensor panel 100. At least part of the transparent window may be exposed to the outside of the touch sensor panel 100, and may thus accommodate contacts with a conductive object, such as the user's body, a stylus pen, or the like. To prevent damage to or the breakdown of the transparent window, a protection layer (not shown) may be additionally provided. The term 'contact,' as used herein, may indicate not only a direct contact by a conductive object with a contact-accommodating surface but also an indirect contact in which the conductive object approaches to the contact-accommodating surface to be in a close vicinity of the contact-accommodating surface. Accordingly, the terms 'touch sensor panel' and 'touch sensing apparatus equipped with a touch sensor panel' may be interpreted as a touch sensor panel capable of not only recognizing a conductive object's direct contact therewith but also detecting any approaching or nearby object.

The sensing electrodes 122 (i.e., the vertical electrodes C11 to C18 and the horizontal electrodes 11a to 15a and 11b to 15b) may be formed on a separate substrate. For example, the sensing electrodes 122 may be attached onto a transparent window by using an adhesive material such as an optical clear adhesive or the like. That is, the sensing electrodes 122 may be formed by patterning an ITO film, which is a PET or thin glass film having ITO formed on one or both surfaces thereof, and attaching the patterned ITO film onto a transparent window. For example, the patterning of the ITO film may be performed by patterning one surface of the ITO film into the shape of the vertical electrodes C11 to C18 and patterning the other surface of the ITO film into the shape of the horizontal electrodes 11a to 15a and 11b to 15b. In this example, the patterned ITO film may be attached onto a transparent window such that the vertical electrodes C11 to C18 may be disposed between the patterned ITO film and the transparent window. For another example, the patterning of the ITO film may be performed by patterning one surface of the ITO film into the shape of the vertical electrodes C11 to C18, horizontal electrodes 11a to 15a and 11b to 15b, and internal wires as 143 and 145, and then attaching the ITO film onto the transparent window.

The vertical electrodes C11 to C18 and the horizontal electrodes 11a to 15a and 11b to 15b may be formed in one body with a transparent window 110 by patterning one surface of the transparent window 110 into the shapes of the vertical electrodes C11 to C18 and the horizontal electrodes 11a to 15a and 11b to 15b. Because, in this example, a process of attaching the sensing electrodes 122 onto the transparent window 110, which often results in a high defect rate, is not performed, it is possible to simplify the manufacture of a touch sensor panel, improve the manufacture yield of a touch sensor panel, reduce the manufacturing cost of a touch sensor panel, and reduce the thickness of an electronic device to which a touch sensor panel is applied.

The term 'in one body,' as used herein, may indicate forming an element directly on another element without the aid of an additional adhesive layer. For example, in a case in which the sensing electrodes 122 are formed in one body with the transparent window 110, the sensing electrodes 122 may be interpreted as being formed directly on one surface of the transparent window 110 without the aid of an adhesive layer such as an OCA or the like. That is, the sensing electrodes 122 may be directly formed on the transparent window 110 through sputtering, ion plating, etching, or the like, instead of forming the sensing electrodes 122 on a separate element such as an ITO film, and attaching the ITO film onto the transparent window 110. The sensing electrodes 122 may be formed using various methods as long as they do not involve a process of attaching the sensing electrodes 122 onto the transparent window 110. For example, the sensing electrodes 122 may be formed by directly patterning an exposed surface of the transparent window 110 or may be directly formed on a transparent window coated with an additional layer, such as an anti-scatter film, a transparent resin, or the like.

The sensing electrodes 122 may all be formed at once in one body with the transparent window 110. The sensing electrodes 122 may also be formed in one body with the transparent window 110 in multiple stages. For example, the sensing electrodes 122 may be formed by forming the vertical electrodes C11 to C18 on one surface of the transparent window 110, coating the transparent window 110 with a dielectric layer, and forming the horizontal electrodes 11a to 15a and 11b to 15b on the dielectric layer. Also, only some of the sensing electrodes 122 may be formed in one body with the transparent window 110. For example, the vertical electrodes C11 to C18 may be formed in one body with the transparent window 110, the horizontal electrodes 11a to 15a and 11b to 15b may be formed on an ITO film, and the ITO film may be attached onto the transparent window 110.

The vertical electrodes C11 to C18 may be classified into one or more groups and may be arranged in units of the groups such that at least a pair of vertical electrodes included in each of the groups may be adjacent to each other. In this example, in a case in which the touch sensor panel 100 is a mutual capacitance touch sensor panel, it is possible to precisely determine a touch location by overlapping or combining the sensing signals provided by a number of vertical electrodes included in each of the groups. For example, referring to FIG. 1, the vertical electrodes C11 to C18 may be classified into four groups, each group having a pair of vertical electrodes, and may be arranged such that a pair of vertical electrodes in each of the groups may be adjacent to each other. In another example, the vertical electrodes C11 to C18 may be evenly spaced to precisely determine a touch location in a horizontal direction.

In a case in which the vertical electrodes C11 to C18 are arranged as illustrated in FIG. 1, the vertical electrodes C11 to C18 may be electrically insulated from one another by being connected to the wires C1 to C8, respectively. In another example, referring to FIG. 3, a pair of neighboring vertical electrodes having a pair of partitioning electrodes interposed therebetween may be electrically connected to each other to reduce the number of channels required. That is, the vertical electrodes C12 and C13 may be electrically connected, the vertical electrodes C14 and C15 may be electrically connected, and the vertical electrodes C16 and C17 may be electrically connected. In this manner, it is possible to reduce the number of channels from eight (ranging from C1 to C8 in the example illustrated in FIG. 1) to five (ranging from C101 to C105). Because a pair of partitioning electrodes interposed between a pair of neighboring vertical electrodes that are coupled to each other may account for parts of different horizontal electrodes, it is possible to precisely determine a touch location. In addition, because the partitioning electrode 14a and the vertical electrode C15 form a sensing region and the partitioning electrode 14a and a part of the vertical electrode C16, which is adjacent to the vertical electrode C15 with the horizontal electrode 14a interposed therebetween, form another sensing region, it is possible to properly determine a touch location using an overlap between the two sensing regions.

At least two of the horizontal electrodes 11a to 15a and 11b to 15b may be arranged to pass through a horizontal axis at an arbitrary position. Referring to a portion 50 of the touch detection area 120 illustrated in FIGS. 1 and 2, the horizontal electrode 11a on a Y-axis location Y1, which includes a plurality of partitioning electrodes 151, 153, 155, and 157 that are disposed at a plurality of odd-numbered X-axis locations X1, X3, X5, and X7, respectively, and the horizontal electrode 11b on the Y-axis location Y1, which includes a plurality of partitioning electrodes 152, 154, 156, and 158 that are disposed at a plurality of even-numbered X-axis locations X2, X4, X6, and X8, respectively, may share a Y axis corresponding to the Y-axis location Y1. In this example, the horizontal electrodes 11a and 11b may be arranged such that a central horizontal axis that horizontally divides the horizontal electrode 11a into halves may coincide with a central horizontal axis that horizontally divides the horizontal electrode 11b into halves. That is, the orthogonal projection of the horizontal electrode 11a with respect to the Y axis may substantially overlap the orthogonal projection of the horizontal electrode 11b with respect to the Y axis.

Referring to FIG. 2(a), which is an enlarged view of the portion 50 of FIG. 1, the horizontal electrodes 11a to 15a and 11b to 15b may be divided into two groups, i.e., a first horizontal electrode group 10A including the horizontal electrodes 11a to 15a, which are disposed on the left side of their respective pairs of vertical electrodes, and a second horizontal electrode group 10B including the horizontal electrodes 11b to 15b, which are disposed on the right side of their respective pairs of vertical electrodes. In the example illustrated in FIG. 1, the partitioning electrodes of each of the horizontal electrodes 11a to 15a and 11b to 15b may be evenly spaced. In another non-limiting example, referring to FIG. 2(b), the horizontal electrodes 11a to 15a and 11b to 15b may be arranged such that two of the partitioning electrodes of each of the horizontal electrodes 11a to 15a and 11b to 15b may be more adjacent to each other than to the other partitioning electrodes. In another non-limiting example, the horizontal electrodes 11a to 15a and 11b to 15b may be arranged such that some of the partitioning electrodes of each of the horizontal electrodes 11a to 15a and 11b to 15b may be more adjacent to each other than the other partitioning electrodes, and that the other partitioning electrodes may be evenly spaced. According to another exemplary embodiment, the first horizontal electrode group 10A and the second horizontal electrode group 10B can be electrically connected to one another such that to decrease the number of the external wires 11A to 15A and 11B to 15B.

In a case in which the touch sensor panel 100 is a mutual capacitance touch sensor panel, a driving signal may be applied to at least one of the vertical electrodes C11 to C18 and/or the first and second horizontal electrode groups 10A and 10B. In this example, electric field lines (i.e., leakage fluxes) may be formed between a pair of adjacent rows or columns. Accordingly, a partitioning electrode and a pair of sectors of a vertical electrode that is adjacent to or in the vicinity of the partitioning electrode may form a sensing region whose charge can be coupled from a driving area to a sensing electrode. When a finger touches down over one of a plurality of sensing regions, some of the electric field lines that extend beyond the cover of the touch sensor panel 100 may be blocked by the finger, reducing the amount of charge coupled in the corresponding sensing region. This reduction in the amount of coupled charge may be detected as part of determining a resultant image of touch. In a case in which the touch sensor panel 100 is a mutual capacitance touch sensor panel, no separate reference ground may be needed.

The operation and the structure of the touch sensor panel 100 will now be described in further detail, assuming that the touch sensor panel 100 is a mutual capacitance touch sensor panel, unless specified otherwise (i.e., unless specified as, for example, a self-capacitance touch sensor panel), that the first and second horizontal electrode groups 10A and 10B are driving electrode groups to which a driving signal is applied, and that the vertical electrodes C11 to C18 are sensing electrodes for detecting a sensing signal.

FIG. 4 illustrates enlarged views of a portion 151 of the touch detection area 120 where a plurality of sensing regions are formed.

In a case in which the touch sensor panel 100 is a mutual capacitance touch sensor panel, a partitioning electrode and a particular sector of a vertical electrode may account for parts of two or more sensing regions. The touch sensor circuit unit of the touch sensor panel 100 may precisely determine a touch location by extracting a horizontal location component and a vertical location component of the touch input from a plurality of overlapping sensing regions and combining the extracted horizontal and vertical location components.

Referring to FIG. 4, a first sensing region 171 may be formed by a first partitioning electrode 161 of the horizontal electrode 14a and a first sensing sector 166 of the vertical electrode C15, a second sensing region 172 may be formed by the first partitioning electrode 161 and a second sensing sector 167 of the vertical electrode C16, a third sensing region 173 may be formed by a second partitioning electrode 162 of the horizontal electrode 14b and the second sensing sector 167 of the vertical electrode C16, and a fourth sensing region 174 may be formed by the second partitioning electrode 162 and the first sensing sector 166 of the vertical electrode 15. The first and fourth sensing regions 171 and 174 may share the first sensing sector 166. The first and second partitioning electrodes 161 and 162 and the first and second sensing sectors 166 and 167 may be used to extract the horizontal and vertical components of a touch location. Because there is an overlap between the first to fourth sensing regions 171 to 174, the touch sensor circuit unit may precisely determine a touch location by combining mutual capacitance variations detected from the first to fourth sensing regions 171 to 174, particularly from the vertical electrodes C15 and C16.

The plurality of sensing regions including one or more overlap sensing regions (such as first to fourth sensing regions 171 to 174) therebetween, as illustrated in FIG. 4, are arranged along a horizontal direction to overlap one another. In another non-limiting example, the overlap sensing regions may be configured to be arranged along a vertical direction or a diagonal direction or to be arranged in the same row with a partitioning electrode interposed therebetween.

Figure 5:
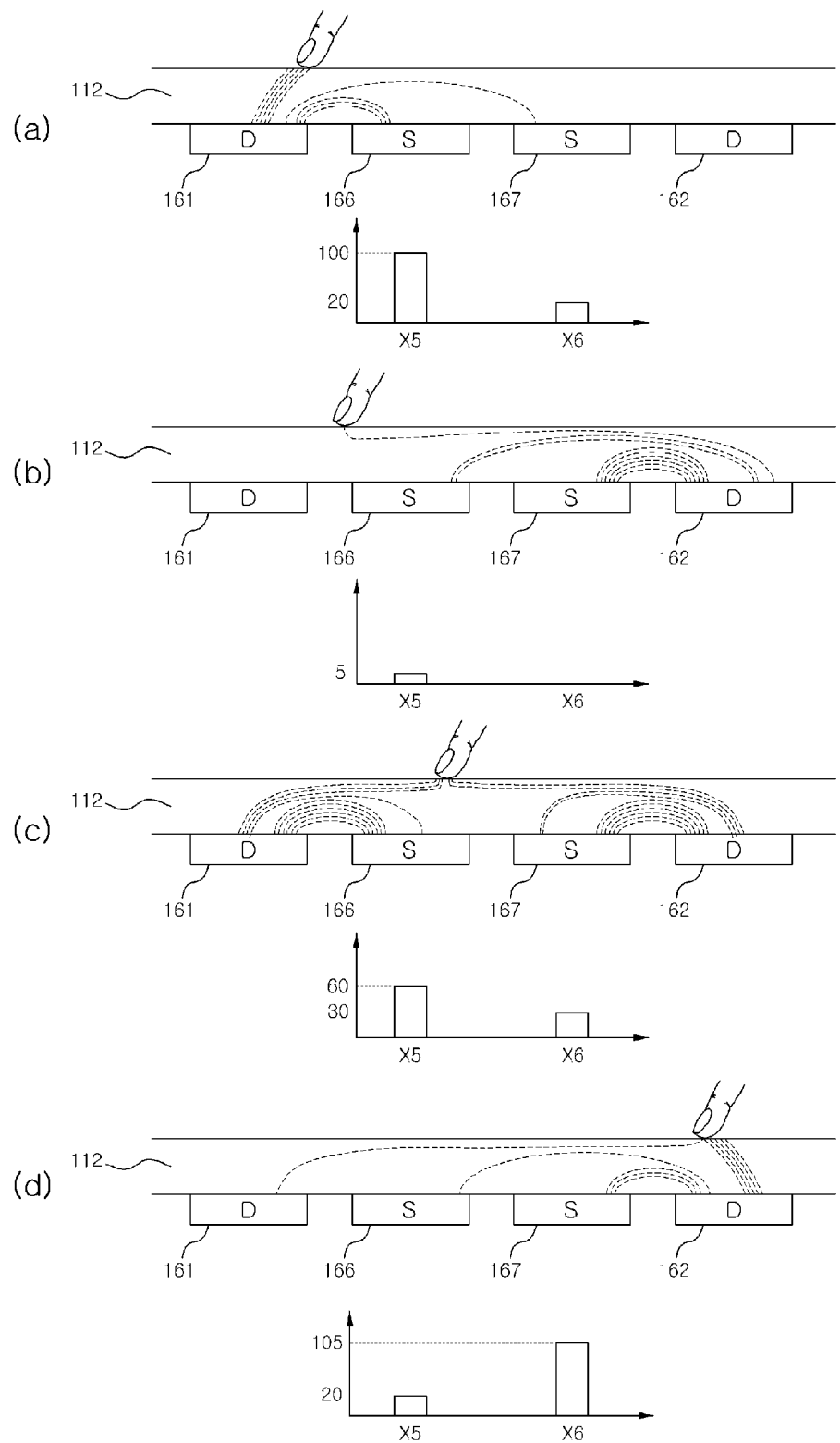
FIGS. 5(a) to 5(d) are plot diagrams of mutual capacitance that is measured from a portion of the touch sensor panel illustrated in FIG. 1.
Figure 6:
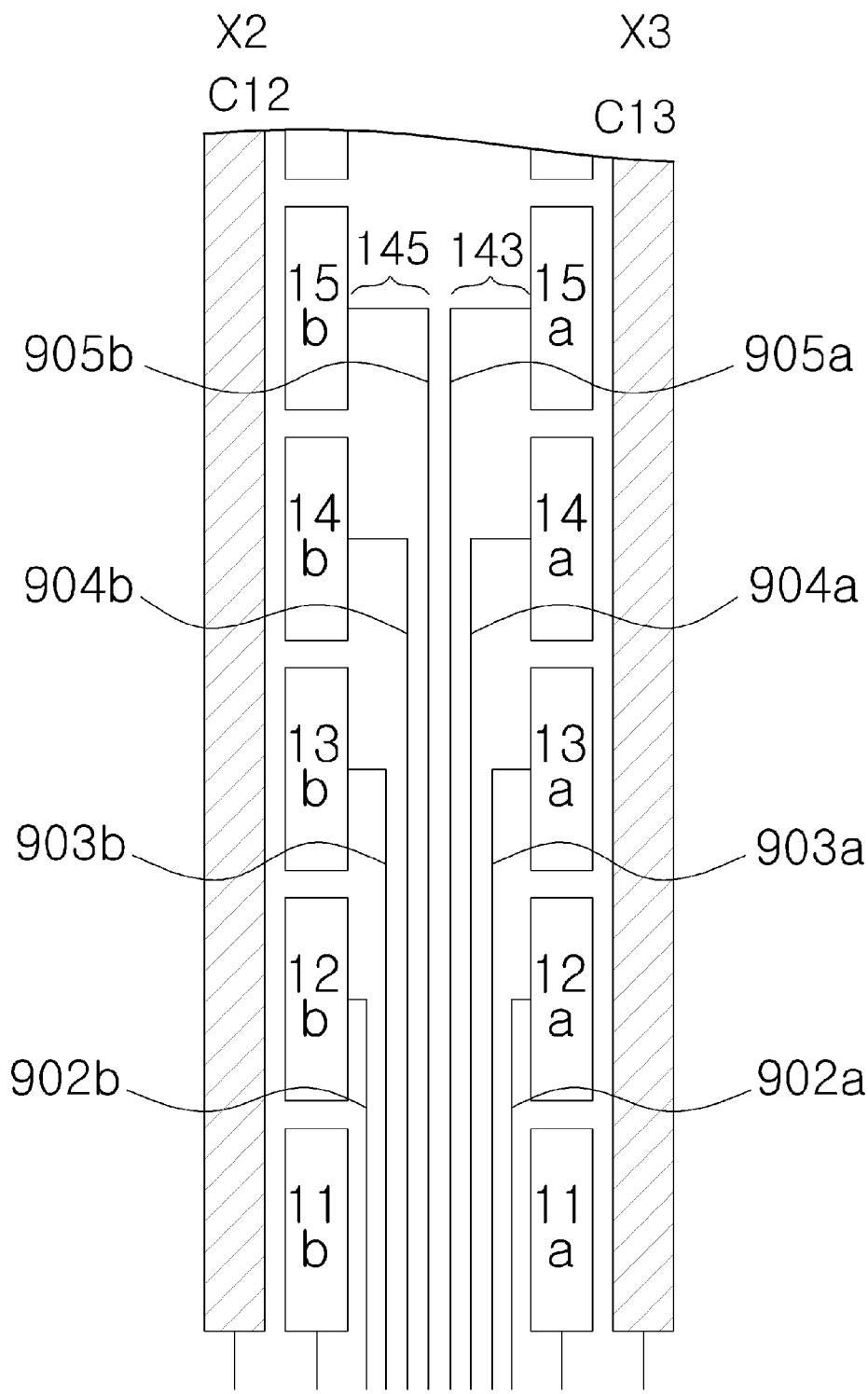
FIG. 6 is an enlarged view of a portion of the touch sensor panel illustrated in FIG. 1.

FIG. 5 illustrates plot views taken along line T-T' of FIG. 1 for explaining mutual capacitance that is measured along the cross-section of the portion 151 of the touch detection area 120. More specifically, FIG. 5 illustrates the variation of mutual capacitance detected by the first and second sensing sectors 166 and 167 of the vertical electrodes C15 and C16 according to the location of a finger in a case in which the first partitioning electrode 161 of the horizontal electrode 14a, the first sensing sector 166, the second sensing sector 167, and the second partitioning electrode 162 of the horizontal electrode 14b are sequentially arranged in an overlap sensing region 151.

Referring to FIG. 5, a cover glass 112, which is a type of substrate, may be disposed over the first partitioning electrode 161, the first sensing sector 166, the second sensing sector 167, and the second partitioning electrode 162. In this example, it is assumed that the first and second partitioning electrodes 161 and 162 serve as driving electrodes, and that the first and second sensing sectors 166 and 167 serve as sensing electrodes.

FIGS. 5(*a*) and 5(*b*) illustrate a case in which an object (for example, a finger) that is placed in contact with the touch sensor panel 100 is located between the first driving electrode 161 and the first sensing electrode 166. Referring to FIG. 5(*a*), when a driving signal is applied to the first driving electrode 161, a mutual capacitance variation of 100 may be detected from the first sensing electrode 166, which is adjacent to the first driving electrode 161, and a mutual capacitance variation of 20 may be detected from the second sensing electrode 167, which neighbors the first sensing electrode 166. Referring to FIG. 5(*b*), a driving signal may be applied to the second driving electrode 162 immediately after the application of a driving signal to the first driving electrode 161. In this example, assuming that the finger substantially remains at the same location because the interval between the time of the application of a driving signal to the first driving electrode 161 and the time of the application of a driving signal to the second driving electrode 162 is short, a mutual capacitance variation of 5 may be detected from the first sensing electrode 166, and no mutual capacitance variation may be detected from the second sensing electrode 167, which is distant apart from the finger.

FIG. 5(*c*) illustrates mutual capacitance measurements in piles obtained from the first and second sensing electrodes 166 and 167 by applying a driving signal to the first sensing electrode 166 and then to the second sensing electrode 167 in a case in which the finger is placed closer to the first sensing electrode 166 than to the second sensing electrode 167. Referring to FIG. 5(*c*), a mutual capacitance variation of 60 may be detected from the first sensing electrode 166, and a mutual capacitance variation of 30 may be detected from the second sensing electrode 167. The closer an object (for example, a finger) that is placed in contact with the touch sensor panel 100 is to a driving electrode, the greater the mutual capacitance variation detected from a sensing electrode that is adjacent to the driving electrode.

FIG. 5(*d*) illustrates mutual capacitance measurements in piles obtained from the first and second sensing electrodes 166 and 167 in a case in which the finger is located between the second sensing electrode 167 and the second driving electrode 162. Referring to FIG. 5(*d*), a mutual capacitance variation of 105 may be detected from the second sensing electrode 167 in the vicinity of the finger, and a mutual capacitance variation of 20 may be detected from the first sensing electrode 166 that is more distant than the second sensing electrode 167 from the finger.

In the example illustrated in FIG. 5, due to the existence of an overlap sensing region, it is possible to increase touch sensing resolution and thus to improve linearity.

Figure 13:
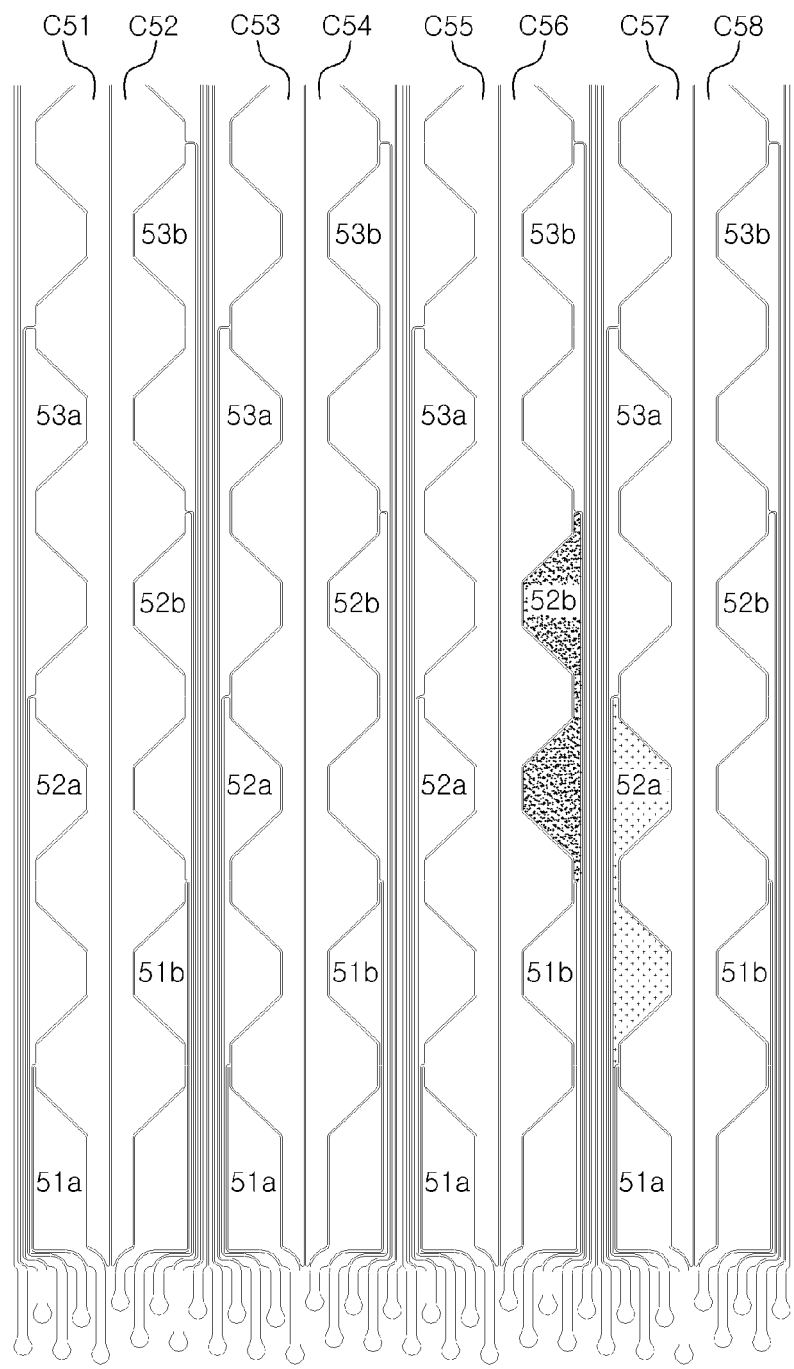
FIG. 13 is a partial view of a touch sensor panel according to another exemplary embodiment.

To precisely determine a touch recognition rate, linearity may be determined. FIG. 13 is a diagram for explaining the concept of linearity. Linearity may indicate how precisely pairs of diagonal positions can be detected in response to the receipt of a diagonal 'sliding' touch input across the touch sensor panel 100. The closer the detected diagonal position pairs are to a diagonal line, the higher the linearity. FIG. 14(*a*) illustrates a case in which a diagonal 'sliding' touch input is detected across the touch sensor panel 100, and FIGS. 14(*b*) and 14(*c*) illustrate the detection of diagonal position pairs in response to the detection of the diagonal 'sliding' touch input. Linearity is higher in the example illustrated in FIG. 14(*c*) than in the example illustrated in FIG. 14(*b*).

To improve touch sensing resolution, a driving signal may be randomly applied to each of the horizontal electrodes 11a to 15a and 11b to 15b. For example, a driving signal may be sequentially applied to the horizontal groups (i.e., the horizontal electrodes 11a to 15a) included in the first horizontal electrode group 10A, and then to the horizontal groups (i.e., the horizontal electrodes 11b to 15b) included in the second horizontal electrode group 10B. In another non-limiting example, a driving signal may be sequentially applied to a plurality of rows of horizontal electrodes (for example, in the order of 11a, 11b, 12a, 12b, ...). In still another non-limiting example, a driving signal may be sequentially applied to a number of driving electrodes that are adjacent to one another in a diagonal direction (for example, in the order of 11a, 12b, 13a, 14b, ...).

Referring to FIG. 4, to provide an optimum touch sensitivity, the first partitioning electrode 161 and the first sensing sector 166 in the first sensing region 171 may have substantially the same area. In case the first partitioning electrode 161 and the first sensing sector 166 do not have the same area, the marginal area between the first partitioning electrode 161 and the first sensing sector 166 may be enlarged so that a leakage electric field may increase, and that the difference between the areas of the first partitioning electrode 161 and the first sensing sector 166 may be offset by the marginal area. For this, the width of the boundary area of each electrode may be reduced, the vertical electrodes C11 to C18 may be formed so as to form a periodic geometric pattern, and the horizontal electrodes 11a to 15a and 11b to 15b may be formed to fill the areas occupied by the vertical electrodes C11 to C18. For example, the periodic geometric pattern may have a triangular or rectangular shape.

The plurality of sensing sectors in any one of the vertical electrodes C11 to C18 are electrically connected to one another in the touch detection area 120, and may thus operate as sensing electrodes. Sensing electrodes may be required to be robust against noise or signals. In the touch sensor panel 100, noise may be generated mainly by a driving signal, which is applied to driving electrodes, and the circuitry in a digital device to which the touch sensor panel 100 is attached.

The influence of noise caused by a driving signal on the vertical electrodes C11 to C18 may be reduced by arranging wires for applying a driving signal to driving electrodes as distant as possible from sensing electrodes. For example, referring to FIGS. 1 and 6, extension lines 902a, 903a, 904a, and 905a that extend from the first horizontal electrode group 10A including the horizontal electrodes 11a to 15a, which are located on the left side of the vertical electrode C13, may be arranged on the left side of the first horizontal electrode group 10A, and extension lines 902b, 903b, 904b, and 905b that extend from the second horizontal electrode group 10B including the horizontal electrodes 11b to 15b, which are located on the right side of the vertical electrode C12 may be arranged on the right side of the second horizontal electrode group 10B. In this example, the first and second horizontal electrode groups 10A and 10B may serve as noise protectors against a driving signal.

Because driving electrodes can serve as noise protectors, driving electrodes may be arranged along the edge of a substrate. For example, referring to FIG. 1, some of the horizontal electrodes included in the first horizontal electrode group 10A may be arranged on the outermost left side of the touch detecting area 120, and some of the horizontal electrodes included in the second horizontal electrode group 10B may be arranged on the outermost right side of the touch detecting area 120.

A noise generated by a display may be compensated by a touch controller that interprets signals detected from a touch detection area using a program.

A noise may be generated even by a slight capacitance variation that may result from an external shock-induced misalignment between a touch detection area and a display. This type of noise may be reduced using a shield layer that may be disposed between a digital device and the touch sensor panel 100. The shield layer will be described later in detail with reference to FIG. 15.

The touch sensor panel 100 may operate not only as a mutual capacitance touch sensor panel but also as a self-capacitance touch sensor panel. In a case in which the touch sensor panel 100 operates as a self-capacitance touch sensor panel, a reference ground plane may be formed on the rear surface of a given substrate, on the same surface of the given substrate where the vertical electrodes C11 to C18 and the first and second horizontal electrode groups 10A and 10B are arranged to be separate from each other by a dielectric material, or on the surface of a separate substrate. Each sensing region in a self-capacitance touch sensor panel may have a self capacitance with respect to a reference ground that may vary in response to the existence of an object in the vicinity of the self-capacitance touch sensor. For example, referring to FIG. 1, each of the vertical electrodes C11 to C18 and the horizontal electrodes included in each of the first and second horizontal electrode groups 10A and 10B may sense a self-capacitance independently.

Figure 7:
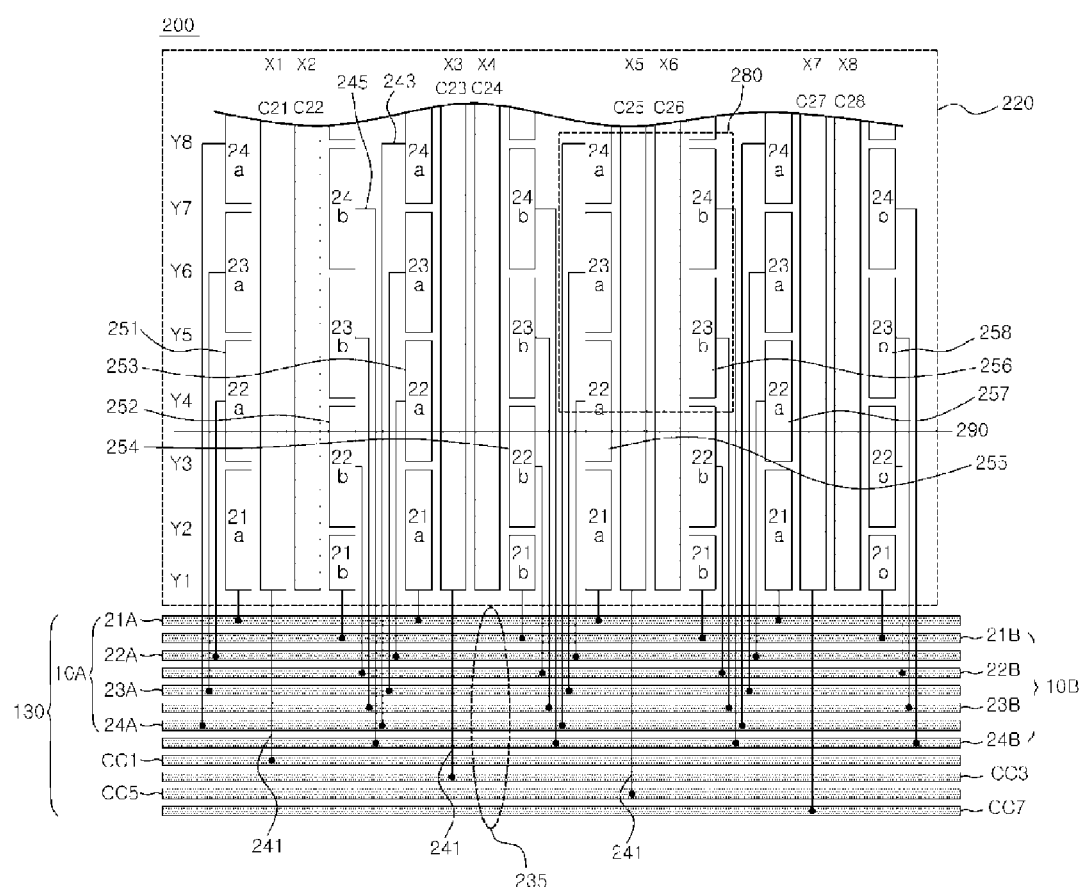
FIG. 7 is a partial view of a touch sensor panel according to another exemplary embodiment.

FIG. 7 is a plan view illustrating part of a touch sensor panel 200 according to another exemplary embodiment. The touch sensor panel 200 is different from the touch sensor panel 100 illustrated in FIG. 1 in that at least two of a plurality of horizontal electrodes are arranged to pass through a horizontal axis at an arbitrary position and to have their central axes misaligned with each other. In FIGS. 1 and 7, like reference numerals indicate like elements, and thus, repetitive descriptions thereof will be omitted.

Referring to FIG. 7, the touch sensor panel 200 includes a touch detection area 220 in which a plurality of overlap sensing regions are arranged, a wiring area 130 that is provided outside the touch detection area 220, and a plurality of vertical electrodes C21 to C28 and a plurality of horizontal electrodes 21a, 21b, 22a, 22b, 23a, 23b, 24a, and 24b that are arranged on the touch detection area 220.

The touch detection area 220 may be an area for detecting a touch location on the touch sensor panel 200. The wiring area 130 may be an area provided outside the touch detection area 220. A plurality of wires (e.g., bus lines) 235 that connect the electrodes C21 to C28, 21a, 21b, 22a, 22b, 23a, 23b, 24a, and 24b and a touch sensor circuit unit (not shown) may be formed in the wiring area 130. The touch sensor circuit unit may detect and determine a touch location in the touch detection area 220 based on a capacitance variation resulting from a user's touch on the touch sensor panel 200. The extension lines of the sensing electrodes in the touch detection area 220 may extend into the wiring area 130. Some of the wires in the wiring area 130, for example, wires CC1, CC3, CC5, and CC7 may be electrically connected to the vertical electrodes C21 to C28, respectively, and some of the wires in the wiring area 130, for example, wires 21A to 24A and 21B to 24B, may be electrically connected to the horizontal electrodes C21 to C28, respectively. The wires in the wiring area 130 may serve as channels 235. The wires in the wiring area 130 may be formed of a metallic material, and may be formed on the substrate 200 at the same level. For example, the wires in the wiring area 130 may be disposed on the substrate 200 at a different level from the horizontal electrodes 21a to 24a and 21b to 24b or the vertical electrodes C21 to C28, and may be connected to the horizontal electrodes 21a to 24a and 21b to 24b or the vertical electrodes C21 to C28 through a plurality of vias. In another example, the wires in the wiring area 130 may be disposed on the substrate 200 at the same level as the horizontal electrodes 21a to 24a and 21b to 24b or the vertical electrodes C21 to C28. In this case, the intersections between the wires in the wiring area 130 and the horizontal electrodes 21a to 24a and 21b to 24b or the vertical electrodes C21 to C28 may be coated with a dielectric material so as to prevent unnecessary electric contacts.

The vertical electrodes C21 to C28 may be disposed at a plurality of horizontal locations X1 to X8, respectively, in the touch detection area 120, thereby forming a plurality of sensing regions. One of the vertical electrodes C21 to C28 may mutually form a sensing region with other electrodes. The touch sensor circuit unit may determine the X-axis component of a touch location using the vertical electrodes C21 to C28.

Each of the vertical electrodes C21 to C28 may include an extension line 241 that extends into the wiring area 130. In the example illustrated in FIG. 7, the extension lines 241 of the odd-numbered vertical electrodes C21, C23, C25, and C27 may extend into a wiring area that is provided below a panel, and the extension lines 241 of the even-numbered vertical electrodes C22, C24, C26, and C28 may extend into a wiring area that is provided above the panel (not shown). The vertical electrodes C21 to C28 may be connected to different wires via the extension lines 241. For example, the vertical electrodes C21 and C23 may be connected to the wires CC1 and CC3, respectively.

Still referring to FIG. 7, the vertical electrodes C21 to C28 may be formed as bars that extend in a vertical direction. In another example, the vertical electrodes C21 to C28 may be formed in various shapes, other than a bar shape, as long as they can form a regular pattern. The vertical electrodes C21 to C28 formed as bars can have branches.

The horizontal electrodes 21b, 21a, 22b, 22a, 23b, 23a, 24b, and 24a may be disposed at vertical locations Y1, Y2, Y3, Y4, Y5, Y6, Y7, and Y8, thereby forming a plurality of sensing regions. One of the horizontal electrodes 21a to 24a and 21b to 24b may form a sensing region with other electrodes. The touch sensor circuit unit may determine the Y-axis component of a touch location by using the horizontal electrodes 21a to 24a and 21b to 24b. The horizontal electrodes 21a to 24a and 21b to 24b may be formed on the substrate at the same level as the vertical electrodes C21 to C28 in the vicinity of the vertical electrodes C21 to C28. Each of the horizontal electrodes 21a to 24a and 21b to 24b may include a plurality of partitioning electrodes and an extension line 243 or 245 by which the partitioning electrodes are electrically connected to one another in the wiring area 130. For example, the partitioning electrodes and the extension line 243 or 245 may be formed at the same time. In another example, the partitioning electrodes may be formed at the same time with a portion of the extension line 243 or 245.

At least two of the horizontal electrodes 21a to 24a and 21b to 24b may be arranged to pass through a horizontal axis at an arbitrary position and to have their central axes misaligned with each other. For example, referring to FIG. 7, the horizontal electrode 22a including a plurality of partitioning electrodes 251, 253, 255, and 257 disposed at the odd-numbered X-axis locations X1, X3, X5, and X7, respectively, and at the Y-axis location Y4, and the horizontal electrode 22b, which includes a plurality of partitioning electrodes 252, 254, 256, and 258 that are disposed at a plurality of the even-numbered X-axis locations X2, X4, X6, and X8, respectively, and the Y-axis location Y3 may share an arbitrary Y axis 290. In this example, the horizontal electrodes 22a and 22b may be arranged such that a central horizontal axis (i.e., Y4) that horizontally divides the horizontal electrode 22a into halves may not coincide with a central horizontal axis (i.e., Y3) that horizontally divides the horizontal electrode 22b into halves. Referring to FIG. 7, the horizontal electrodes 21a to 24a and 21b to 24b may be classified into a first group 20A including the horizontal electrodes 21a to 24a, which are disposed on the left side of their respective vertical electrodes, and a second group 20B including the horizontal electrodes 21b to 24b, which are disposed on the right side of their respective vertical electrodes.

Figure 8:
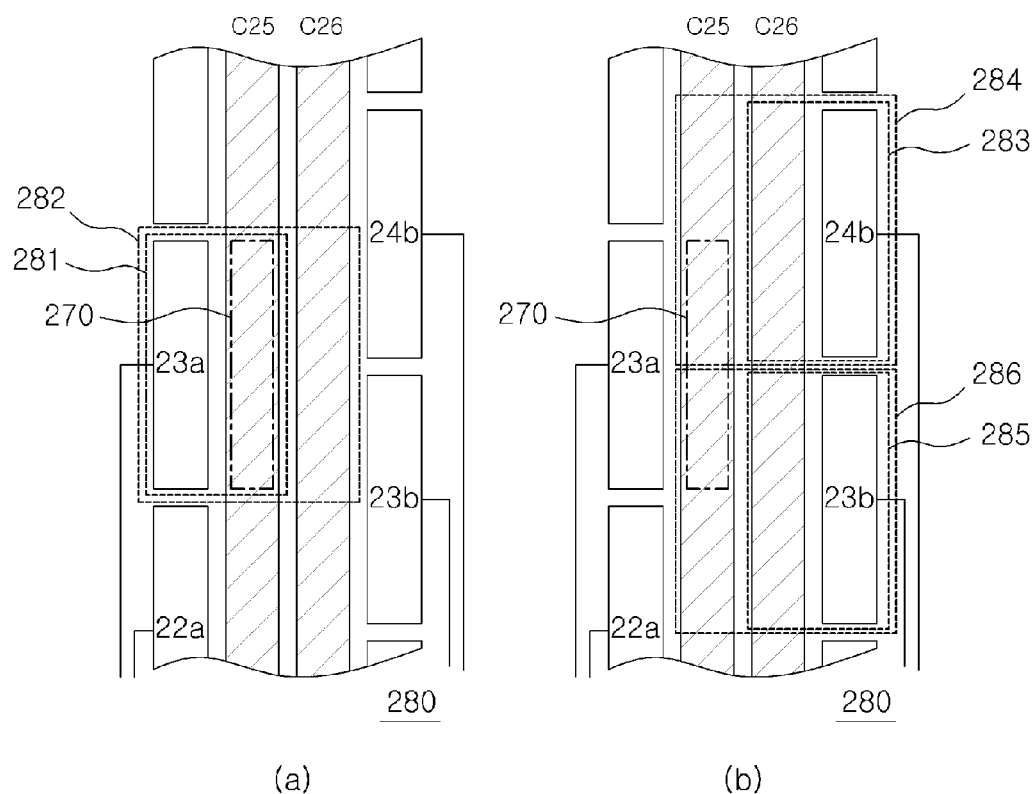
FIGS. 8(a) and 8(b) are enlarged views of examples of a plurality of sensing regions formed in the touch sensor panel illustrated in FIG. 7.

FIG. 8 illustrates a plurality of sensing regions that are formed in a portion 280 of the touch sensor panel 200.

In this example, it is assumed that the touch sensor panel 200 operates as a mutual capacitance touch sensor panel. Referring to FIG. 8, when a driving signal is applied to the horizontal electrode 23a, some of the partitioning electrodes of the horizontal electrode 23a may form a first sensing region 281 with part of the vertical electrode C25, and may form a second sensing region 282 with part of the vertical electrode C26. When a driving signal is applied to the horizontal electrode 24b, some of the partitioning electrodes of the horizontal electrode 24b may form a third sensing region 283 with part of the vertical electrode C26, and may form a fourth sensing region 284 with part of the vertical electrode C25. When a driving signal is applied to the horizontal electrode 23b, some of the partitioning electrodes of the horizontal electrode 23b may form a fifth sensing region 285 with part of the vertical electrode C26, and may form a sixth sensing region 286 with part of the vertical electrode C25. The first, fourth, and sixth sensing regions 281, 284, and 286 may overlap at least part of a sensing sector 270. Because there is an overlap between a plurality of sensing regions, it is possible to improve sensing resolution and linearity.

Figure 9:
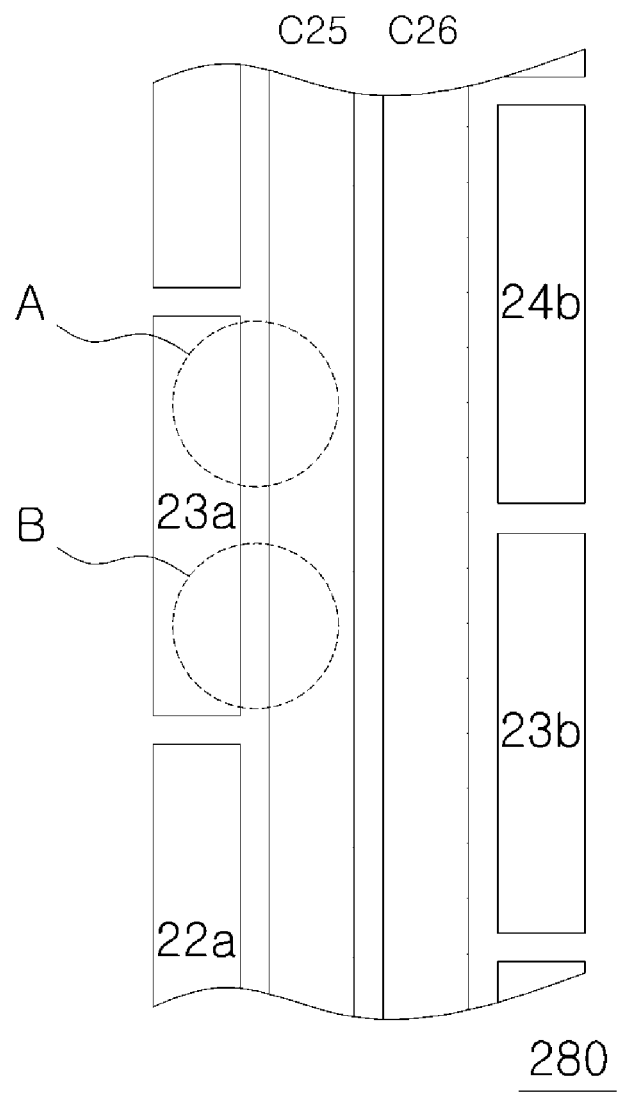
FIG. 9 is an enlarged view of portion 280 of FIG. 7 for explaining an example of determining the location of an object that is placed in contact with the touch sensor panel illustrated in FIG. 7.

FIG. 9 is an enlarged top view of the portion 280 of the touch sensor panel 200.

In this example, it is assumed that the touch sensor panel 200 operates as a mutual capacitance touch sensor panel. Referring to FIG. 9, reference characters A and B indicate points of contact with an object, such as a finger. In a case in which a driving signal is applied to the horizontal electrode 23a, the vertical electrode C25 or C26 may detect the same mutual capacitance drop from locations A and B. Alternatively, in a case in which a driving signal is applied to the horizontal electrode 23b, the vertical electrode C25 or C26 may detect a considerable mutual capacitance drop only when the finger is located at location B. That is, by applying a driving signal to each of the horizontal electrodes 23a, 23b, and 24b and detecting any mutual capacitance drop, it is possible to determine whether location A or B has been in contact with an object, such as a finger. In addition, by combining various sensing values obtained by the detection, it is possible to determine whether locations A and B have both been in contact with an object, such as a finger. The determination of locations A and B has been described above with reference to FIG. 9. However, it is also possible to precisely determine various other locations than locations A and B by combining various sensing values obtained by detecting any mutual capacitance drop in response to the application of a driving signal.

According to the example illustrated in FIG. 9, the touch sensor panel 200 can precisely determine a Y coordinate of a touch location with the use of fewer driving electrodes, as compared to a related-art touch sensor panel. Therefore, it is possible to maintain a high resolution while reducing the number of channels required.

Figure 10:
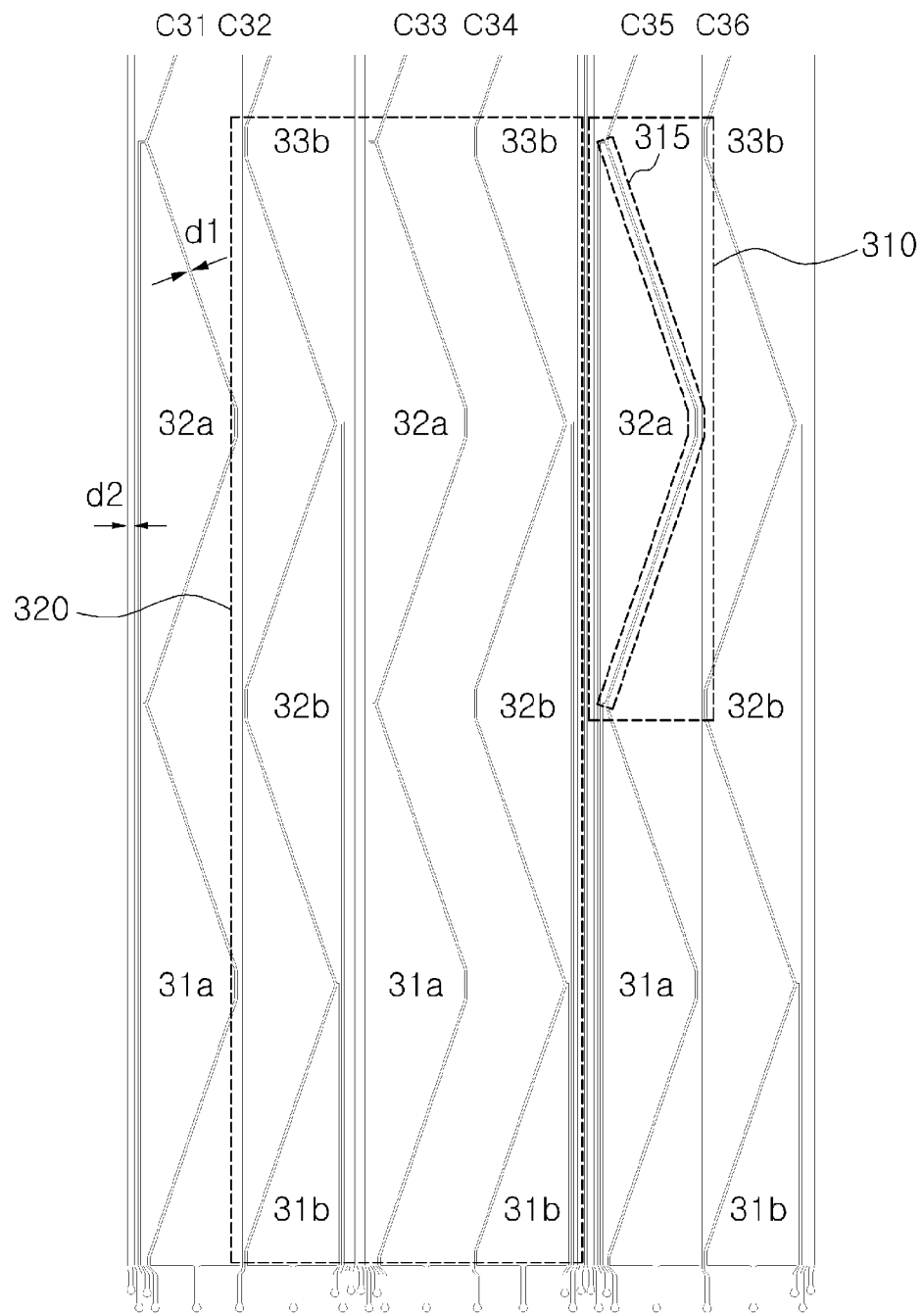
FIG. 10 is a partial view of a touch sensor panel according to another exemplary embodiment.
Figure 11:
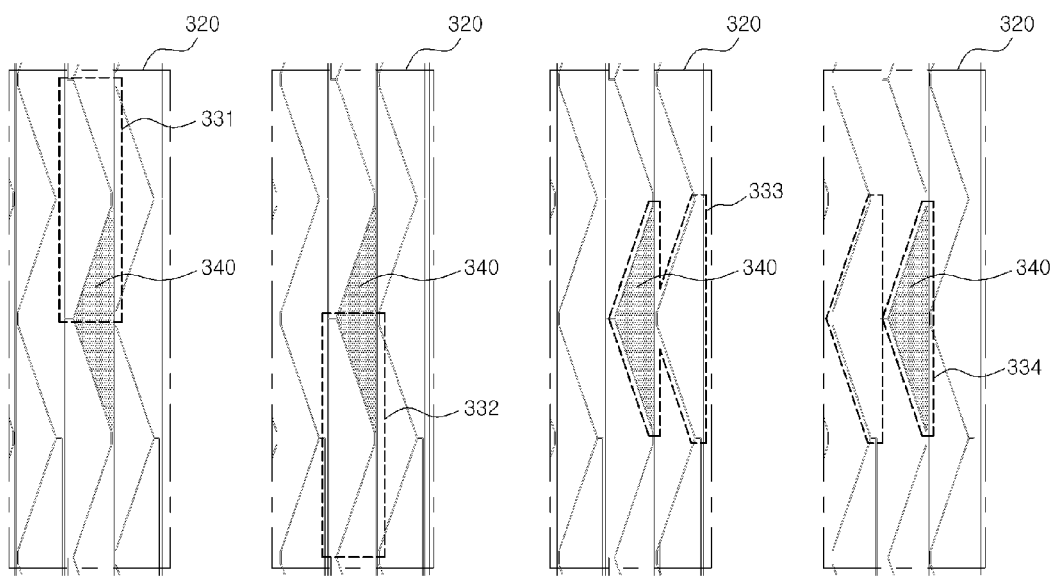
FIG. 11 is an enlarged view of a portion of the touch sensor panel illustrated in FIG. 10.

FIG. 10 is a plan view illustrating part of a touch sensor panel according to another exemplary embodiment. The touch sensor panel illustrated in FIG. 10 is different from the touch sensor panel 200 illustrated in FIG. 7 in that each of the vertical electrodes thereof forms a series of triangular patterns. FIG. 11 is enlarged top views of portion 320 of the touch sensor panel illustrated in FIG. 10.

The touch sensor panel illustrated in FIG. 10 includes a plurality of vertical electrodes C31 to C36 and a first group of horizontal electrodes 31a and 32a and a second group of horizontal electrodes 31b, 32b, and 33b.

Referring to FIG. 10, the left side of the vertical electrode C31 may extend in a zigzag manner along a vertical direction and the right side of the vertical electrode C31 may extend straight along the vertical direction, thereby forming a series of triangular patterns that face toward the left. The left side of the vertical electrode C32, which is formed on the right side of the vertical electrode C31, may extend straight along the vertical direction and the right side of the vertical electrode C32 may extend in a zigzag manner along the vertical direction, thereby forming a series of triangular patterns that face toward the right. The vertical electrodes C31 and the vertical electrode C32 may be aligned such that they may be misaligned with each other. Instead, the vertical electrode C31 may be aligned with the vertical electrodes C33 and C35, and the vertical electrode C32 may be aligned with the vertical electrodes C34 and C36.

Still referring to FIG. 10, the horizontal electrodes in the first group and the horizontal electrodes in the second group may be arranged along the vertical direction. For example, the horizontal electrodes in the first group, i.e., the horizontal electrodes 31a and 32a, may be arranged on the left side of their respective odd-numbered vertical electrodes, and may be spaced apart from the left side of their respective odd-numbered vertical electrodes by a predetermined distance, and the horizontal electrodes in the second group, i.e., the horizontal electrodes 31b, 32b, and 33b, may be arranged on the right side of their respective even-numbered vertical electrodes, and may be spaced apart from the right side of their respective even-numbered vertical electrodes by a predetermined distance. Each of the horizontal electrodes 31a and 32a and 31a to 33b may include an extension line through which they may be electrically connected to outside a touch detection area.

FIG. 11 illustrates a plurality of overlap sensing regions that may be formed in the portion 320 of the touch sensor panel illustrated in FIG. 10. Referring to FIG. 11, first through fourth sensing regions 331 to 334 may be formed in connection with a sensing sector 340. In a case in which the sensing sector 340 operates as a sensing electrode, the sensing sector 340 may detect multiple mutual capacitance variations in response to the application of a driving signal. A touch sensor circuit unit (not shown) of the touch sensor panel illustrated in FIG. 10 may precisely determine a touch location by overlapping or combining a plurality of sensing signals.

In the electrode pattern illustrated in FIG. 10, a long separation line 315 may be formed in a sensing region 310, and thus, a leakage electric current may increase. Therefore, the intensity of the sensing signal detecting a mutual capacitance variation may increase, and thus, the precision of touch sensing may increase, as compared to a touch sensor panel having no such electrode pattern.

In the example illustrated in FIGS. 10 and 11, a driving electrode and a sensing electrode that form a sensing region together may not necessarily have the same area. The difference between the area of the driving electrode and the area of the sensing electrode may be reduced by narrowing a width d1 of the separation line between the driving electrode and the sensing electrode and a width d2 of the extension line of the driving electrode. In this manner, the touch sensor circuit unit of the touch panel sensor illustrated in FIG. 10 may improve the linearity of the detection of a touch input.

Figure 12:
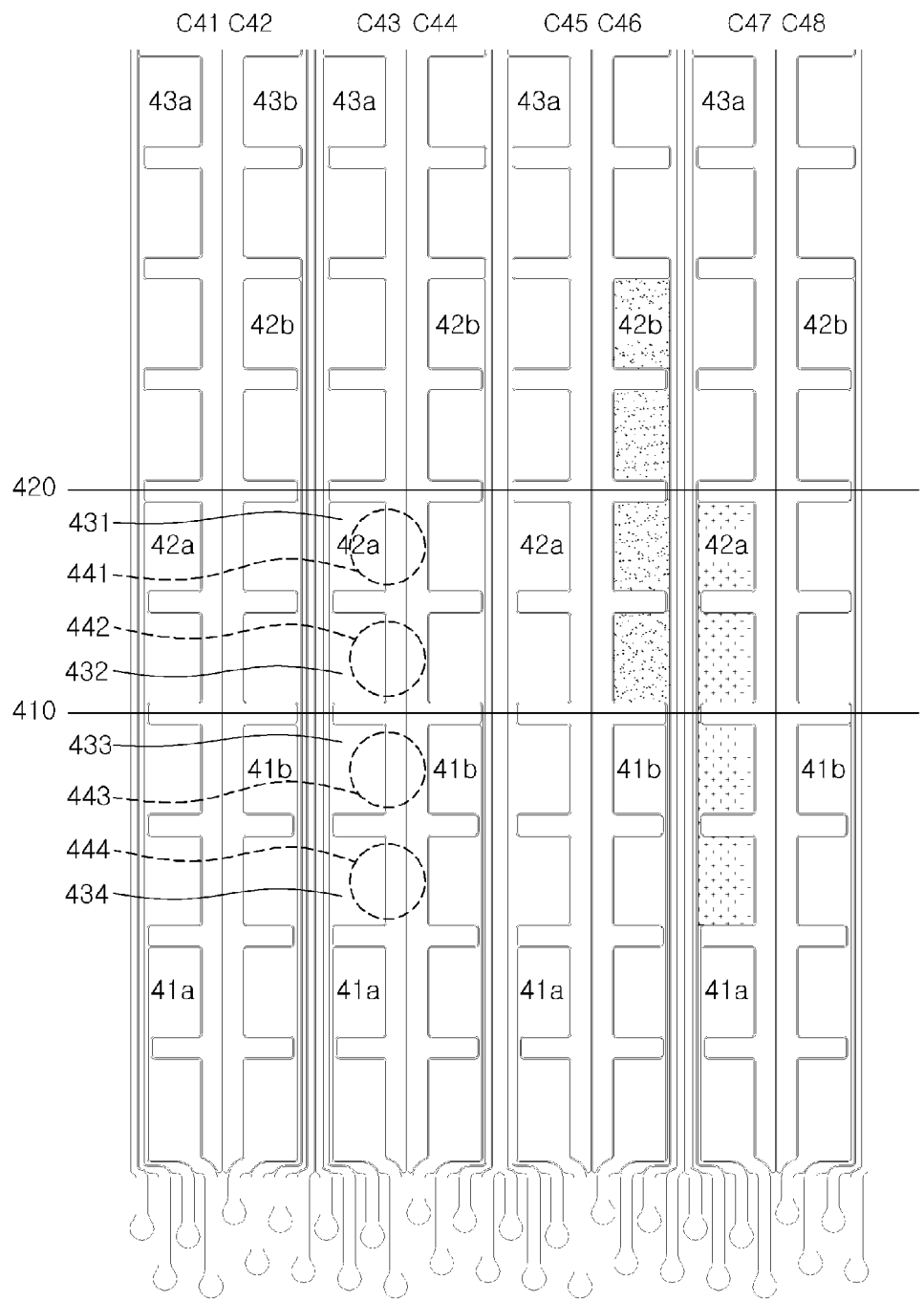
FIG. 12 is a partial view of a touch sensor panel according to another exemplary embodiment.

FIG. 12 is a plan view illustrating part of a touch sensor panel according to another exemplary embodiment. The touch sensor panel illustrated in FIG. 12 is different from the touch sensor panel 200 illustrated in FIG. 7 and the touch sensor panel illustrated in FIG. 10 in that the vertical electrodes thereof are each formed in the shape of a comb.

Referring to FIG. 12, a first group of horizontal electrodes 41a to 43a and a second group of horizontal electrodes 41b to 43b may be arranged such that the central horizontal axes of the horizontal electrodes 41a to 43a may be misaligned with the central horizontal axes of the horizontal electrodes 41b to 43b. For example, a central horizontal axis 410 of the horizontal electrode 42a may be misaligned with a central horizontal axis 420 of the horizontal electrode 42b.

Two or more adjacent partitioning electrodes of each of the horizontal electrodes 41a to 43a and 41b to 43b may be electrically connected to each other. According to the example illustrated in FIG. 12, it is possible to precisely determine a touch location while reducing the number of channels required. Referring to FIG. 12, the horizontal electrode 42a may include four patches 431 to 434. The detection of a touch location in or near each of the patches 431 to 434 may be performed by combining a plurality of sensing signals sensed from a vertical electrode adjacent to a corresponding patch and to which a driving signal is provided. For example, in a case in which a portion 441 is in contact with a finger, the location of the finger may be determined by combining a sensing signal resulting from the application of a driving signal to the horizontal electrode 43a and a sensing signal resulting from the application of a driving signal to the horizontal electrode 42b. Alternatively, in a case in which a portion 442 is in contact with a finger, the location of the finger may be determined by combining a sensing signal resulting from the application of a driving signal to the horizontal electrode 42b and a sensing signal resulting from the application of a driving signal to the horizontal electrode 41b. Alternatively, in a case in which a portion 443 is in contact with a finger, the location of the finger may be determined by combining a sensing signal resulting from the application of a driving signal to the horizontal electrode 41b and a sensing signal resulting from the application of a driving signal to the horizontal electrode 41a. The combination of sensing signals sensed when an object, such as a finger, is located in the portion 442 may be distinguished from the combination of sensing signals sensed when the finger is located in the portion 443 because a mutual capacitance variation resulting from the application of a driving signal to the horizontal electrode 42b, which is horizontally adjacent to the portion 442, is larger than a mutual capacitance variation resulting from the application of a driving signal to the horizontal electrode 41b, which is diagonally adjacent to the portion 442.

FIG. 13 is a plan view illustrating part of a touch sensor panel according to another exemplary embodiment. The touch sensor panel illustrated in FIG. 13 is different from the touch sensor panel 200 illustrated in FIG. 7 in that each of the horizontal electrodes includes two trapezoidal protrusions connected to each other.

The touch sensor panel illustrated in FIG. 13 includes two groups of horizontal electrodes, i.e., horizontal electrodes 51a to 53a and horizontal electrodes 51b to 53b, and each of the horizontal electrodes 51a to 53a and 51b to 53b may be formed in a shape obtained by combining two trapezoidal protrusions. The touch sensor panel illustrated in FIG. 13 also includes a plurality of vertical electrodes C51 to C58. The vertical electrodes C51 to C58 may be formed to conform to the shape of their respective horizontal electrodes.

FIG. 15 illustrates exploded and plan views illustrating a touch sensor panel including a shield layer according to another exemplary embodiment.

Referring to FIG. 15, a touch sensor panel 530 may be disposed on a digital device 510. The touch sensor panel 530 may include a touch detecting portion 560, which is formed on one surface of an external substrate 570, and a shield layer 540, which is formed at the bottom of the touch detecting portion 560. The external substrate 570 may serve as a surface of contact with a user or as a supporting substrate for the touch detecting portion 560. For a proper operation of the touch sensor panel 530 as a capacitance touch sensor panel, the external substrate 570 may be formed of a material having a uniform dielectric constant, and may be configured to have a predetermined thickness. A plurality of sensing electrodes capable of detecting any contact with the user may be arranged on the touch detecting portion 560. The touch detecting portion 560 may be formed in one body with the external substrate 570, or may be attached onto the external substrate 570 using an adhesive layer.

The touch sensor panel 530 may be installed on the outermost surface of the digital device 510 and may thus be able to be contacted by the user. Furthermore, the touch sensor panel 530 may be electrically affected by circuitry in the digital device 510. For example, in a case in which the touch sensor panel 530 is a touchpad panel, an electrical noise from the electric circuitry at the bottom of the touch sensor panel 530 may infiltrate into the touch sensor panel 530. Alternatively, in a case in which the touch sensor panel 530 is a touch screen panel, electrical noises generated not only from the electric circuitry at the bottom of the touch sensor panel 530 but also from a display device may infiltrate into the touch sensor panel 530. A noise may also be generated due to even a minute capacitance variation resulting from a slight misalignment between the touch detecting portion 560 and a display device that may be caused by an external shock applied to a transparent window. The shield layer 540 may prevent the touch detection portion 560 from malfunctioning due to such electrical noises, and may thus improve the performance of the touch sensor panel 530.

The shield layer 540 may include a substrate 541, which is formed of, for example, PET, and a conductive thin layer 543, which is formed on the substrate 541 by using a conductive material, such as ITO. The conductive thin layer 543 may substantially block electrical noises. The conductive thin layer 543 may be connected to a ground source to properly serve as an electrical shield. For this, the shield layer 540 may also include wires 545 that connect the conductive thin layer 543 to the ground source. The wires 545 may be formed of a metallic material, such as silver. The shield layer 540 may also include a transparent adhesive layer 547 that attaches the shield layer 540 onto the touch detecting portion 560. The transparent adhesive layer 547 may be formed of, for example, an optical clear adhesive (OCA).

An attachment unit 515 may be formed along the boundaries of the digital device 510 so that an air gap 520 may be formed between the touch sensor panel 530 and the digital device 510 when the touch sensor panel 530 is attached onto the digital device 510.

Figure 16:
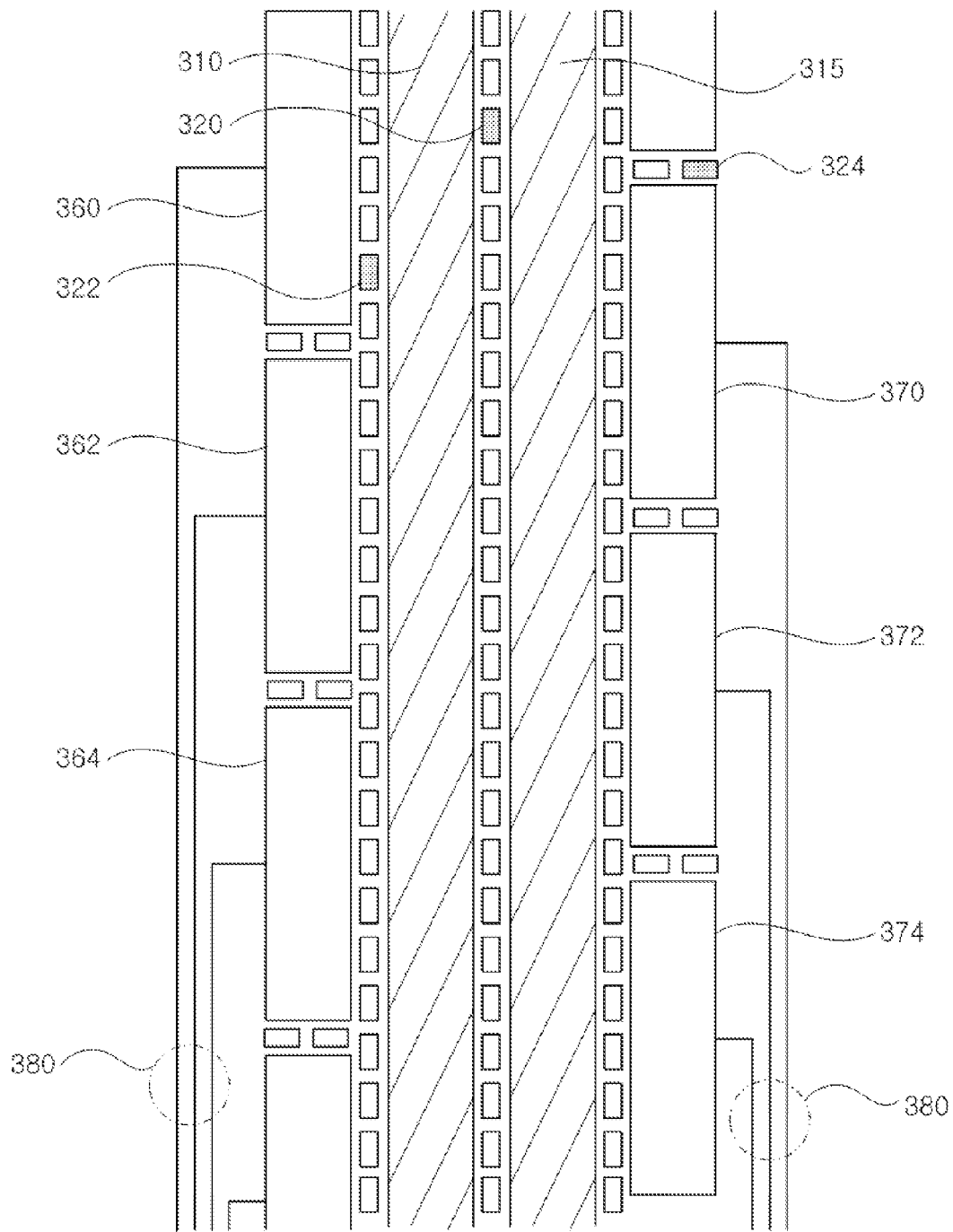
FIG. 16 is a diagram illustrating a touch detection area according to an exemplary embodiment.
Figure 17:
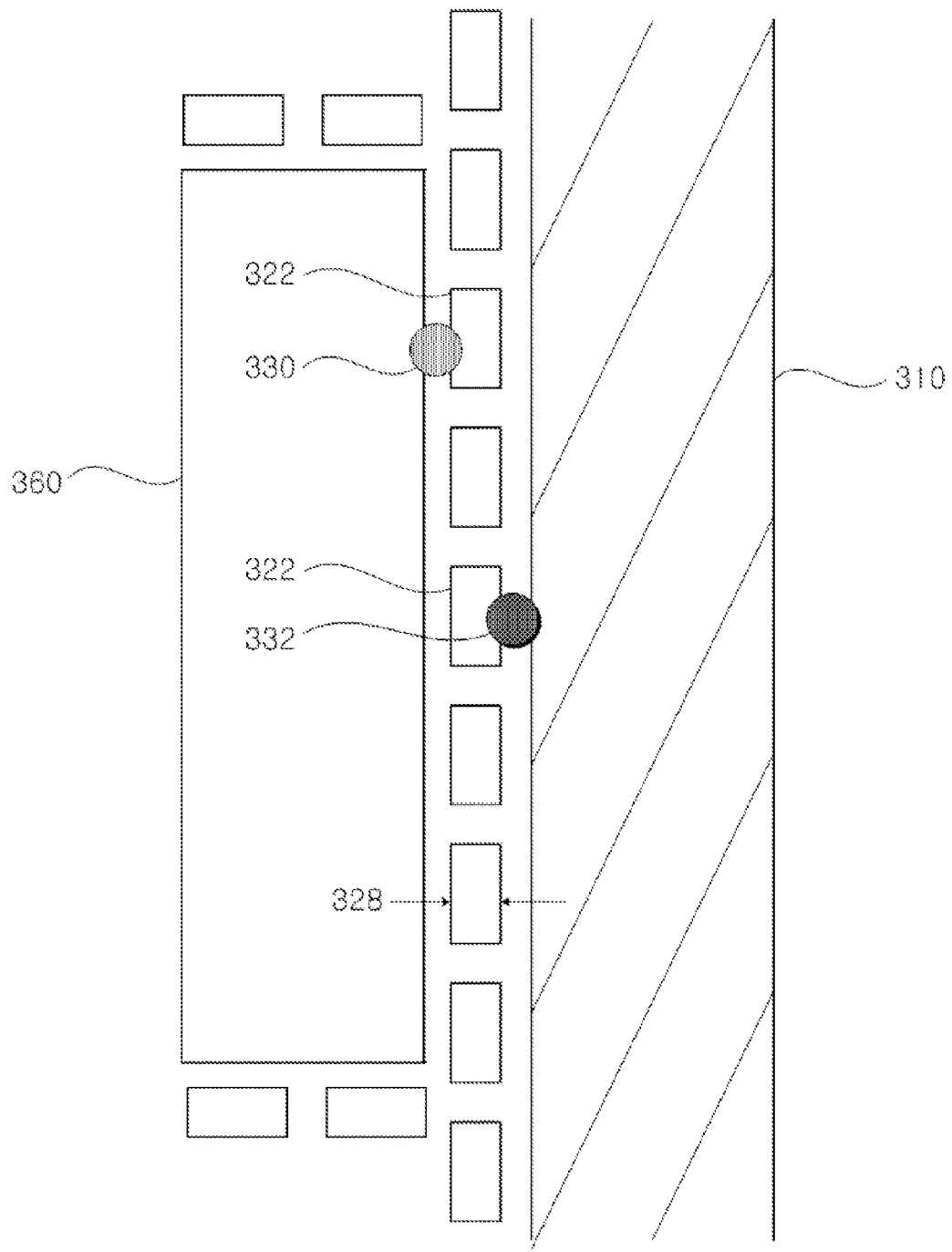
FIG. 17 is an enlarged view of a part of the touch detection area illustrated in FIG. 16.

FIG. 16 is a diagram illustrating a touch detection area, according to an exemplary embodiment, and FIG. 17 is an enlarged view illustrating a part of the touch detection area illustrated in FIG. 16. In this exemplary embodiment, a touch sensor panel, unlike the touch sensor panel 200 illustrated in FIG. 7, includes a touch detection area having dummy electrodes. In FIGS. 7 and 16, like reference numeral indicate like elements.

Referring to FIG. 16, a touch detection area may include a plurality of vertical electrodes 310 and 315, a plurality of horizontal electrodes 360, 362, 364, 370, 372 and 374, a plurality of internal wires 380 and a plurality of dummy electrodes 320, 322 and 324. The pattern of electrodes on the touch detection area may repeat along the direction of a horizontal or vertical axis.

The vertical electrodes 310 and 315 extend vertically, are disposed at horizontal positions, and each form a part of a sensing area independently or together with other electrodes. The vertical electrodes 310 and 315 are substantially transparent and may be formed of a conductive material.

The horizontal electrodes 360, 362, 364, 370, 372 and 374 are disposed near the vertical electrodes 310 and 315, and may each form a sensing area independently or together with other electrodes. The horizontal electrodes 360, 362, 364, 370, 372 and 374 may be formed on the same level as the vertical electrodes 310 and 315. The horizontal electrodes 360, 362, 364, 370, 372 and 374 may be formed of the same material as the vertical electrodes 310 and 315 by the same manufacturing process(es).

In this exemplary embodiment, the orthogonal projection of the first horizontal electrode 360 with respect to a vertical axis may partially overlap the orthogonal projection of the second horizontal electrode 370, which belongs to a different row from that of the first horizontal electrode 360, with respect to the vertical axis. As a result, as described above with reference to FIG. 8, a variety of overlapping sensing areas may be formed, and thus, the sensing resolution and linearity may be improved.

The internal wires 380 may be electrically connected to the horizontal electrodes 360, 362, 364, 370, 372 and 374. The internal wires 380 may extend beyond the touch detection area and may electrically connect horizontal electrodes at particular locations. The internal wires 380 may be formed on the same level as the vertical electrodes 310 and 315 or horizontal electrodes 360, 362, 364, 370, 372 and 374. The internal wires 380 may be formed of the same material as the vertical electrodes 310 and 315 or the horizontal electrodes 360, 362, 364, 370, 372 and 374 by the same manufacturing process(es).

The dummy electrodes 320, 322 and 324 may be insulated from one another, may also be insulated from the vertical electrodes 310 and 315, the horizontal electrodes 360, 362, 364, 370, 372 and 374, and the internal wires 380, and may be formed on the same level as the vertical electrodes 310 and 315, the horizontal electrodes 360, 362, 364, 370, 372 and 374, and the internal wires 380.

Electrodes and wires formed on the touch detection area may all be formed on the same level. This type of single-layer electrode pattern may cause electrodes connected to different channels to be short-circuited upon occurrence of etching error or infiltration of foreign materials. To prevent this problem, the gap between electrodes may be widened. In this example, however, visibility of displayed image may deteriorate due to the difference between the transmittance of etched parts and the transmittance of non-etched parts (for example, electrodes).

In this exemplary embodiment, the dummy electrodes 320, 322 and 324 are disposed between pairs of adjacent electrodes, thereby reducing the probability of an electrode pattern being visible to the naked eye due to the difference between the transmittance of etched parts and the transmittance of non-etched parts and improving visibility of displayed image, resulted from a high transparency. Also, referring to FIG. 17, the dummy electrodes 320, 322 and 324 may prevent electrodes connected to different channels from being short-circuited regardless of occurrence of a non-etched portion 330 or infiltration of a foreign material 332. Accordingly, the dummy electrodes 320, 322 and 324 may serve as defect buffers and may thus considerably reduce a defect rate.

The dummy electrodes 320, 322 and 324 may be formed of a transparent material. To improve visibility, the dummy electrodes 320, 322 and 324 may be formed to have the same transmittance as the vertical electrodes 310 and 315 and the horizontal electrodes 360, 362, 364, 370, 372 and 374. To simplify the manufacture of a touch sensor panel, the dummy electrodes 320, 322 and 324 may be formed of the same material as the vertical electrodes 310 and 315 and the horizontal electrodes 360, 362, 364, 370, 372 and 374 by the same manufacturing process(es).

To improve visibility, the dummy electrodes 320, 322 and 324 may be disposed between electrodes, for example, between adjacent vertical electrodes, between adjacent vertical and horizontal electrodes or between adjacent horizontal electrodes.

If the vertical electrodes 310 and 315, which occupy a larger area than the horizontal electrodes 360, 362, 364, 370, 372 and 374, are short-circuited, the sensing capability of a touch sensor panel may considerably deteriorate. Therefore, to simplify the manufacture of a touch sensor panel, the dummy electrodes 320, 322 and 324 may be disposed only between adjacent vertical electrodes or between adjacent vertical and horizontal electrodes.

The larger the size of the dummy electrodes 320, 322 and 324, the smaller the non-dummy electrode area becomes. Therefore, to maintain a particular level of sensing precision or sensing resolution, the area of the dummy electrodes 320, 322 and 324, and particularly, a width 328 of the dummy electrodes 320, 322 and 324, may be set to have a predetermined upper bound.

The width 328 of the dummy electrodes 320, 322 and 324 may be dependent upon the gap between adjacent vertical electrodes or between adjacent vertical and horizontal electrodes. The gap between non-dummy electrodes, i.e., the vertical electrodes 310 and 315 and the horizontal electrodes 360, 362, 364, 370, 372 and 374, may be set to be greater than an average size of foreign materials. In a case in which the size of foreign materials follows a normal distribution, a foreign material size with an arbitrary probability within the normal distribution may be set as a maximum gap between non-dummy electrodes. The gap between non-dummy electrodes may be determined based on the shape or average width of the vertical electrodes 310 and 315 or the horizontal electrodes 360, 362, 364, 370, 372 and 374 as described above with reference to FIG. 4 or based on the size of foreign materials.

Too small a gap between a non-dummy electrode and a dummy electrode may result in a high defect rate, may cause the non-dummy electrode and the dummy electrode to be short-circuited, and may even cause other dummy electrodes to be short-circuited. Thus, the gap between a non-dummy electrode and a dummy electrode may be set to a particular minimum. For example, the gap between a non-dummy electrode and a dummy electrode may be set to a minimum of 10 µm.

Too large a gap between a non-dummy electrode and a dummy electrode may deteriorate visibility, sensing resolution and sensing precision. Thus, the gap between a non-dummy electrode and a dummy electrode may be set to have a particular maximum. For example, the gap between a non-dummy electrode and a dummy electrode may be set to a maximum of 50 µm.

The gap between adjacent dummy electrodes may be determined based on at least one of the shape of the adjacent dummy electrodes, an average size or a distribution probability of foreign materials infiltrated into the adjacent dummy electrodes, and a defect rate (such as an etching error rate).

Figure 18:
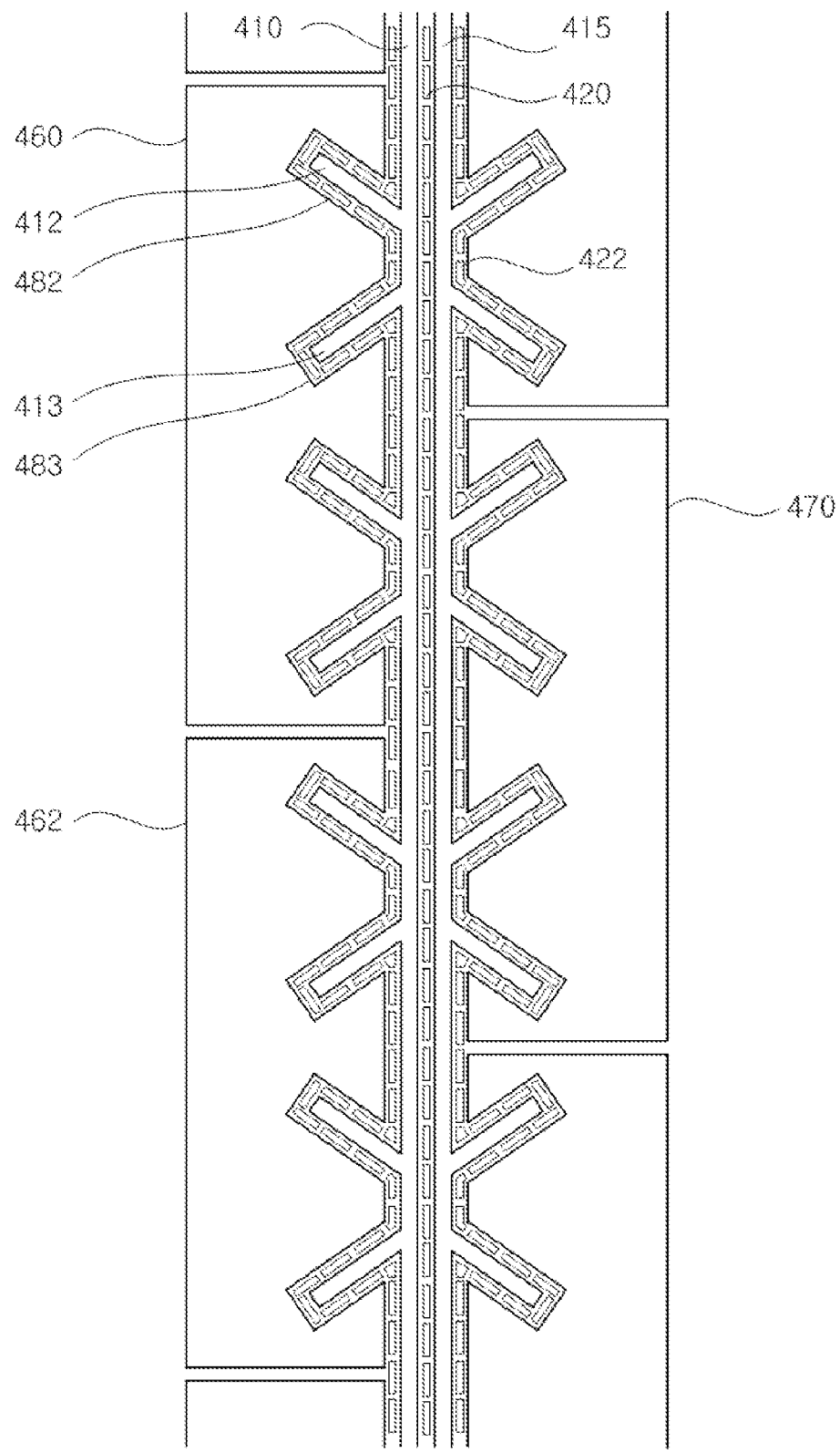
FIG. 18 is a diagram illustrating a touch detection area according to an exemplary embodiment.
Figure 19:
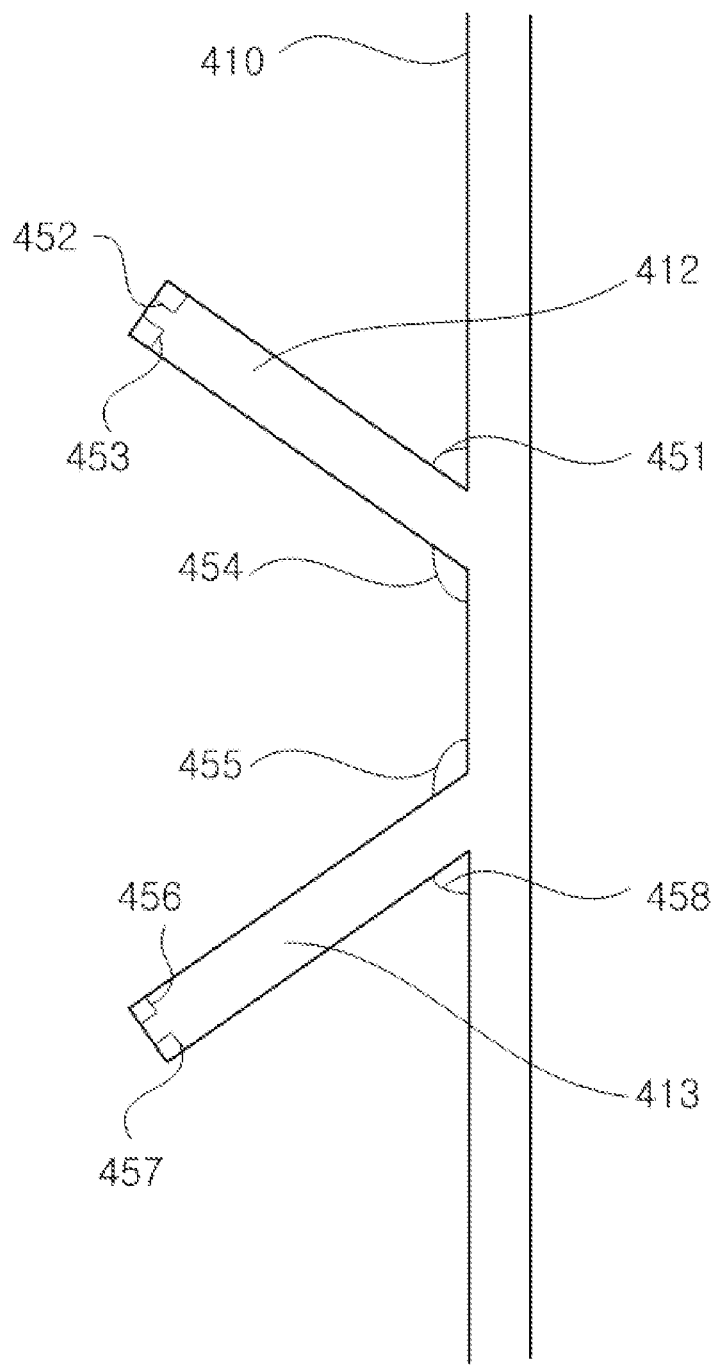
FIG. 19 is a diagram illustrating an example of a vertical electrode illustrated in FIG. 18, according to an exemplary embodiment.
Figure 20:
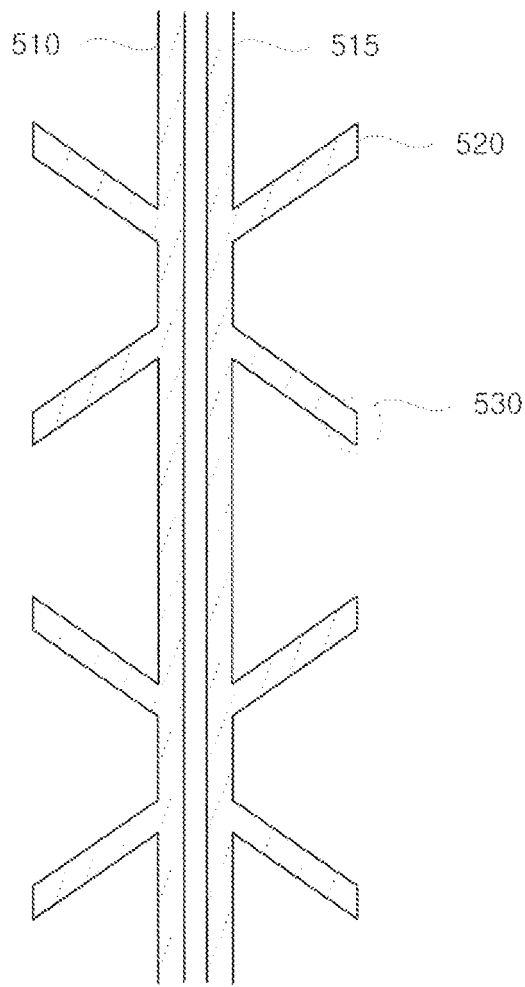
FIG. 20 is a diagram illustrating another example of the vertical electrode illustrated in FIG. 18, according to another exemplary embodiment.

FIG. 18 is a diagram illustrating a touch detection area according to an exemplary embodiment, FIG. 19 is a diagram illustrating an example of a part of a vertical electrode illustrated in FIG. 18, according to an exemplary embodiment, and FIG. 20 is a diagram illustrating another example of a part of the vertical electrode illustrated in FIG. 18, according to another exemplary embodiment.

Referring to FIG. 18, a touch detection area may include a plurality of vertical electrodes 410 and 415, a plurality of horizontal electrodes 460, 462 and 470 and a plurality of dummy electrodes 420 and 422. The pattern of electrodes on the touch detection area may repeat along the direction of a horizontal or vertical axis.

The vertical electrodes 410 and 415 extend vertically, are disposed at horizontal positions, and each form a part of a sensing area independently or together with other electrodes. The vertical electrodes 410 and 415 are substantially transparent and may be formed of a conductive material.

Each of the vertical electrodes 410 and 415 may include a plurality of first protrusions 412 and a plurality of second protrusions 413 that are formed on an outer side of each of the vertical electrodes 410 and 415. For example, the first protrusions 412 and the second protrusions 413 may be bar-shaped.

The first protrusions 412 may have a first angle 451 with the vertical electrode 420. The second protrusions 413, which are adjacent to their respective first protrusions 412, may have a second angle 455 with the vertical electrode 420. The sum of the first and second angles 451 and 455 may be substantially 180 degrees. The first protrusions 412 and the second protrusions 415 may be formed to alternate with each other along a vertical direction.

First ends of the first protrusions 412 and the second protrusions 413 may be connected to a vertical electrode, and second ends of the first protrusions 412 and the second protrusions 413 may be open. For example, referring to FIG. 18, the second ends of the first protrusions 412 and the second protrusions 413 may be perpendicularly cut. As another example, the second ends of the first protrusions 412 and the second protrusions 413 may be cut along a vertical direction. However, the shape of the second ends of the first protrusions 412 and the second protrusions 413 is not limited to those set forth herein.

Referring to FIG. 19, the vertical electrode 410 may include a plurality of refraction portions 451 to 458 that are formed on one side of the vertical electrode 410. The angles of the refraction portions 451 to 458 may be repetitions of a predefined finite sequence. For example, referring to FIG. 12, the predefined finite sequence may include 90 degrees only. As another example, referring to FIGS. 11 and 13, the predefined finite sequence may include 120 degrees only. As another example, referring to FIG. 19, the predefined finite sequence may include a first acute angle 451, a direct angle 452, a direct angle 453, a first obtuse angle 454 that forms a straight angle with the first acute angle 451, a second obtuse angle 455, a direct angle 456, a direct angle 456, and a second acute angle 458 that forms a straight angle with the second obtuse angle 454.

The horizontal electrodes 460, 462 and 470 are disposed near the vertical electrodes 410 and 415, and may each form a sensing area independently or together with other electrodes. The horizontal electrodes 460, 462 and 470 may be formed on the same level as the vertical electrodes 410 and 415. The horizontal electrodes 460, 462 and 470 may be formed of the same material as the vertical electrodes 410 and 415 by the same manufacturing process(es).

In this exemplary embodiment, the orthogonal projection of the first horizontal electrode 460 with respect to a vertical axis may partially overlap the orthogonal projection of the second horizontal electrode 470, which belongs to a different row from that of the first horizontal electrode 460, with respect to the vertical axis. As a result, as described above with reference to FIG. 8, a variety of overlapping sensing areas may be formed, and thus, the sensing resolution and linearity may be improved Each of the horizontal electrodes 460, 462 and 470 may include one or more recesses. The shape of the recesses may correspond to the shape of the protrusions of a vertical electrode adjacent to each of the horizontal electrodes 460, 462 and 470. The number of recesses of each of the horizontal electrodes 460, 462 and 470 may be determined by the length of the horizontal electrodes 460, 462 and 470. The number of recesses of each of the horizontal electrodes 460, 462 and 470 may correspond to the number of protrusions of the vertical electrode adjacent to a corresponding horizontal electrode. For example, the first horizontal electrode 460 may include a plurality of recesses 482 and 483.

The dummy electrodes 420 and 422 may be insulated from each other, may also be insulated from the vertical electrodes 410 and 415 and the horizontal electrodes 460, 462 and 470, and may be formed on the same level as the vertical electrodes 410 and 415 and the horizontal electrodes 460, 462 and 470.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A touch sensor panel, comprising:
    a touch detection area on a surface of a substrate, the touch detection area including a plurality of sensing regions;
    a wiring area on the surface of the substrate outside the touch detection area,
    wherein:
        the touch detection area includes
        a plurality of vertical electrodes that are arranged along a plurality of vertical axes, each vertical electrode including a plurality of sensing sectors, and
        a plurality of patches that each forms a part of the sensing regions and constitutes a part of one of a plurality of horizontal electrodes arranged along a plurality of horizontal axes, are arranged to be adjacent to the vertical electrodes, the horizontal electrodes include first and second horizontal electrodes that are arranged along a first horizontal axis;

the vertical electrodes include a first vertical electrode having a plurality of sensing sectors including a first sensing sector and a second vertical electrode having a plurality of sensing sectors including a second sensing sector, wherein the first and second vertical electrodes are adjacent to each other and disposed between a first patch of the first horizontal electrode and a second patch of the second horizontal electrode;

wherein when a driving signal is applied to the first and second horizontal electrodes to detect mutual capacitance variations caused by a user's touch on the touch detecting area, the first sensing sector forms a first sensing area with the first patch and forms a second sensing area with the second patch, and the second sensing sector forms a third sensing area with the first patch and forms a fourth sensing area with the second patch, and wherein the first, second, third, and fourth sensing areas at least partially overlap each other forming a plurality of overlapping sensing regions;

the first patch neighbors the second patch;

the first and second patches are at least partially facing each other; and wherein the driving signal is sequentially applied to the first and second horizontal electrodes, and patches of each of the first and second horizontal electrode are electrically connected to each other; and a touch sensor circuit electrically connected to the touch detection area and detecting the user's touch by using an extracted horizontal location component and a vertical location component from each of the plurality of overlapping sensing regions and combining the extracted horizontal and vertical location components.

2. The touch sensor panel of claim 1, further comprising:
a plurality of internal wires connected to the patches, respectively, and extending into the wiring area,
wherein:
each of the internal wires comprises a first portion within the touch detection area and a second portion in the wiring area;
the wiring area includes a plurality of external wires including a first external wire that is connected to internal wires connected to the patches of the first horizontal electrode and a second external wire that is connected to internal wires connected to the patches of the second horizontal electrode.

3. The touch sensor panel of claim 2, wherein the substrate is a transparent window and at least one of the vertical electrodes, the horizontal electrodes, and the internal wires are formed in one body with the transparent window.

4. The touch sensor panel of claim 1, wherein:
patches of the first horizontal electrode and patches of the second horizontal electrode are alternatingly arranged along the first horizontal axis;
a third patch of the first horizontal electrode neighbors the second patch and at least partially faces the second patch;
the vertical electrodes further include a third vertical electrode that neighbors the second vertical electrode;
the second patch and the third patch are disposed between the second vertical electrode and the third vertical electrode;
the first vertical electrode is electrically insulated from the second vertical electrode and the third vertical electrode; and the second vertical electrode and the third vertical electrode are electrically connected to each other.

5. The touch sensor panel of claim 1, wherein at least one of distances between adjacent patches, between adjacent vertical electrodes, and between a vertical electrode and a patch that are adjacent to each other is uniform.

6. The touch sensor panel of claim 5, wherein a lower bound of at least one of the distances is determined based on a size of foreign materials infiltrated during a manufacture of the touch sensor panel.

7. The touch sensor panel of claim 5, wherein an upper bound of at least one of the distances is determined based on an average width of the patches or an average width of the vertical electrodes.

8. The touch sensor panel of claim 1, wherein at least one of the vertical electrodes includes a plurality of protrusions.

9. The touch sensor panel of claim 8, wherein a patch adjacent to at least one of the protrusions includes at least one recess.

10. The touch sensor panel of claim 8, wherein:
the protrusions include first protrusions that are bar-shaped and second protrusions that are also bar-shaped and are adjacent to the first protrusions;
the first protrusions have a first angle with one of the vertical electrodes and the second protrusions have a second angle with one of the vertical electrodes; and
the sum of the first and second angles is substantially 180 degrees.

11. The touch sensor panel of claim 1, wherein:
a first end of one of the vertical electrodes includes a plurality of refraction portions;
angles of the refraction portions are repetitions of a predefined finite sequence; and
the finite sequence includes a first obtuse angle, a direct angle, a direct angle, a first acute angle that forms a straight angle with the first obtuse angle, a second acute angle, a direct angle, a direct angle, and a second obtuse angle that forms a straight angle with the second acute angle.

12. The touch sensor panel of claim 1, further comprising:
a shield layer which is disposed over the touch detection area to electrically shield the touch detection area.

13. A display device comprising the touch sensor panel of claim 1.

14. The touch sensor panel of claim 1, wherein the touch detection area further includes a plurality of dummy electrodes that are insulated from each other and from at least some of the vertical electrodes and the patches.

15. The touch sensor panel of claim 14, wherein at least one of the dummy electrodes is disposed at least one of between adjacent patches, between adjacent vertical electrodes, and between a vertical electrode and a patch that are adjacent to each other.

16. The touch sensor panel of claim 14, wherein a distance between a dummy electrode and a patch that are adjacent to each other or a distance between a dummy electrode and a vertical electrode that are adjacent to each other are 10 to 50 µm.

17. The touch sensor panel of claim 14, wherein the dummy electrodes include first and second dummy electrodes that are adjacent to each other, a distance between the first and second dummy electrodes is determined by at least one of a gap between foreign materials infiltrated during a manufacture of the touch sensor panel, a distribution probability of the foreign materials, and a shape of the first and second dummy electrodes.

18. The touch sensor panel of claim 1, wherein the first and second vertical electrodes are immediately adjacent to each other.

19. The touch sensor panel of claim 1, wherein the second sensing sector forms a third sensing area with the second patch, with the first to third sensing areas at least partially overlapping with each other.

20. The touch sensor panel of claim 19, wherein the first sensing sector forms a fourth sensing area with the second patch, with the first to fourth sensing areas at least partially overlapping with each other.

21. A display device having a touch sensor panel, the touch panel comprising:
- a touch detection area on a surface of a substrate, the touch detection area including a plurality of sensing regions;
- a wiring area on the surface of the substrate outside the touch detection area, wherein:
- the touch detection area includes
- a plurality of vertical electrodes that are arranged along a plurality of vertical axes, each vertical electrode including a plurality of sensing sectors,
- a plurality of horizontal electrodes that are arranged along a plurality of horizontal axes and include first, second and third horizontal electrodes, each horizontal electrode including a plurality of patches, wherein the vertical electrodes include first and second vertical electrodes that are adjacent to each other, and wherein the first and second vertical electrodes are disposed between a first patch of the first horizontal electrode, a second patch of the second horizontal electrode and a third patch of the third horizontal electrode, wherein the first patch partially faces the second patch and the third patch, and wherein central axes that pass through center portions of the first to third patches in a horizontal direction are misaligned with each other, and wherein when a driving signal is applied to the first to third horizontal electrodes to detect mutual capacitance variations caused by a user's touch on the touch detecting area, a first sensing sector forms a first sensing area with the first patch, a second sensing area with the second patch and a third sensing area with the third patch, and wherein the first, second, and third sensing areas at least partially overlap each other forming a plurality of overlapping sensing areas; and wherein the driving signal is sequentially applied to the first to third horizontal electrodes, and patches of each of the first to third horizontal electrode are electrically connected to each other; and a touch sensor circuit electrically connected to the touch detection area and detecting the user's touch by using an extracted horizontal location component and a vertical location component from each of the plurality of overlapping sensing regions and combining the extracted horizontal and vertical location components.

22. The display device of claim 21, further comprising a plurality of internal wires connected to the patches and extending into the wiring area, wherein the first patch partially faces the second patch and the third patch without the internal wires therebetween.

* * * * *